United States Patent
Yamada et al.

(10) Patent No.: US 7,000,600 B1
(45) Date of Patent: Feb. 21, 2006

(54) FUEL INJECTION CONTROL APPARATUS FOR INTERNAL COMBUSTION ENGINE

(75) Inventors: Takafumi Yamada, Susono (JP); Yoshimasa Watanabe, Sunto-gun (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 10/534,863

(22) PCT Filed: Sep. 29, 2004

(86) PCT No.: PCT/JP2004/014703

§ 371 (c)(1),
(2), (4) Date: May 12, 2005

(87) PCT Pub. No.: WO2005/031139

PCT Pub. Date: Apr. 7, 2005

(30) Foreign Application Priority Data

Sep. 30, 2003 (JP) .............................. 2003-340402

(51) Int. Cl.
*F02M 37/04* (2006.01)

(52) U.S. Cl. ...................................... 123/501; 123/494

(58) Field of Classification Search ............... 123/500, 123/501, 357, 494, 478; 73/119 A, 116, 73/117, 3
See application file for complete search history.

(56) References Cited

U.S. PATENT DOCUMENTS

| | | | |
|---|---|---|---|
| 4,463,729 A * | 8/1984 | Bullis et al. ................. | 123/478 |
| 4,463,733 A * | 8/1984 | Tsai ............................ | 123/501 |
| 4,760,830 A * | 8/1988 | Bullis et al. ................. | 123/501 |
| 5,623,909 A * | 4/1997 | Wertheimer ................. | 123/501 |
| 5,718,203 A | 2/1998 | Shimada et al. | |
| 5,950,598 A | 9/1999 | Wenzlawski et al. | |
| 6,353,791 B1 * | 3/2002 | Tuken et al. ................. | 701/114 |
| 6,513,488 B1 * | 2/2003 | Enoki et al. ................. | 123/305 |
| 2002/0023623 A1 * | 2/2002 | Okumura et al. ........... | 123/491 |

FOREIGN PATENT DOCUMENTS

| | | |
|---|---|---|
| EP | 1 318 288 A2 | 6/2003 |
| FR | 2 759 416 A1 | 8/1998 |
| JP | A-09-256886 | 9/1997 |
| JP | A-10-227251 | 8/1998 |
| JP | A-2000-054889 | 2/2000 |

* cited by examiner

*Primary Examiner*—Carl S. Miller
(74) *Attorney, Agent, or Firm*—Oliff & Berridge, PLC

(57) ABSTRACT

In controlling power supply time, a variation in the fuel injection quantity caused by a variation in the fuel injection rate at the in-cylinder pressure of the engine (detected or estimated value in the running state of the internal combustion engine) relative to the fuel injection rate at a reference in-cylinder pressure (under the condition of an injector characteristic measuring benchmark test), and in addition, a variation in the fuel injection start time is corrected. In the calculation of the variation in the fuel injection quantity, a fuel injection rate changing behavior model in which changing behavior of the fuel injection rate is modeled as a trapezoid is used to calculate the areas of $\Delta q1$ and $\Delta q2$. The variation in the fuel injection start time $\Delta \tau d$ is calculated based on the rail pressure and the variation in the in-cylinder pressure. In this way, there is provided a technology for controlling the fuel injection quantity that changes with a change in the in-cylinder pressure with improved accuracy.

7 Claims, 13 Drawing Sheets

FIG. 4
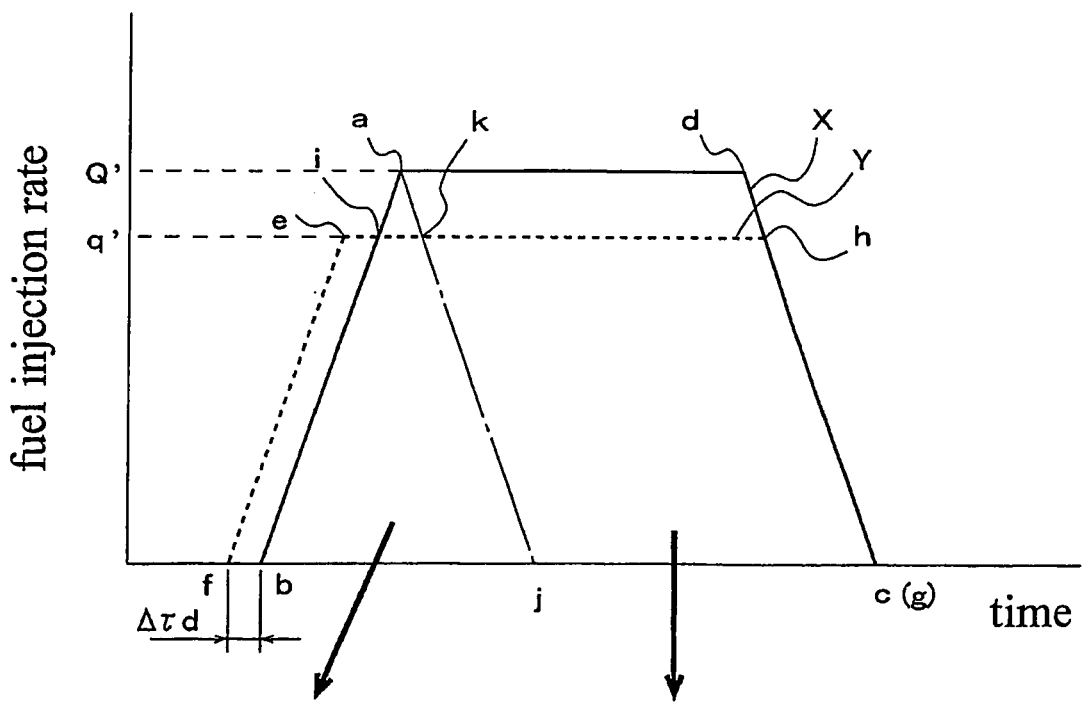
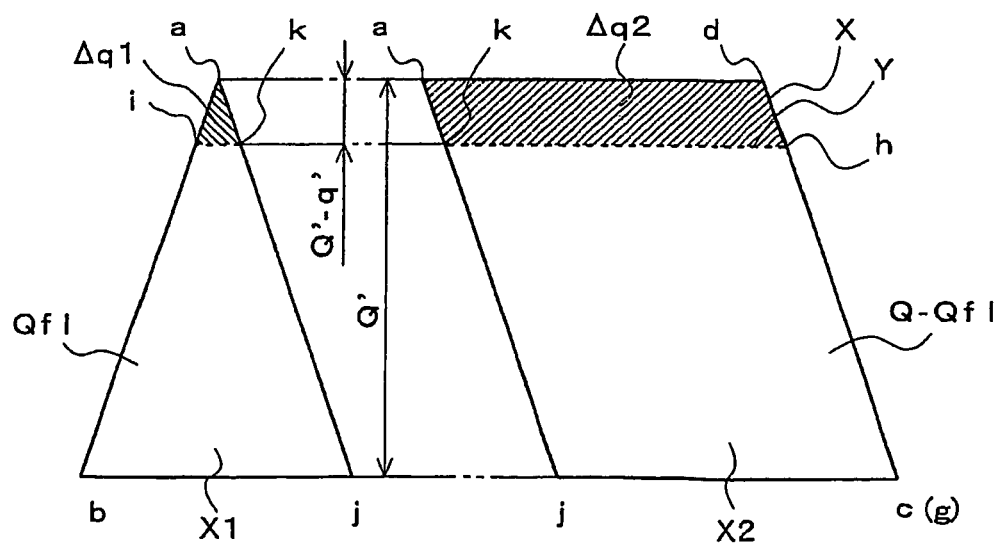

FUEL INJECTION CONTROL APPARATUS FOR INTERNAL COMBUSTION ENGINE

TECHNICAL FIELD

The present invention relates to a fuel injection control apparatus for an internal combustion engine.

BACKGROUND ARTS

Conventionally, among direct injection internal combustion engines having a fuel injection valve (or an injector) for injecting fuel directly into the interior of the cylinder, one having a function of correcting the opening time of the fuel injection valve based on the pressure in the interior of the cylinder (or the in-cylinder pressure) is known (see, for example, patent document 1 listed later).

The reason why this function is adopted is that the pressure in the interior of the cylinder (the in-cylinder pressure) acts as a back pressure against the fuel injection valve. In this function, the in-cylinder pressure that changes in accordance with the running condition of the engine is calculated to correct the opening time of the fuel injection valve, thereby obtaining a desired fuel injection quantity.

However, in the above-described conventional art, the in-cylinder pressure is calculated, and then the fuel injection rate (i.e. the quantity of the fuel injected per unit time) is calculated based on the pressure difference between that in-cylinder pressure and the pressure of the fuel introduced to the fuel injection valve. Then, the opening time of the fuel injection valve is calculated based on the calculated fuel injection rate and the required fuel quantity. Thus, in the conventional art as such, no consideration has been given to changes in the start time of the fuel injection.

This point will be discussed in the following with reference to FIG. 14. FIG. 14 shows changing behavior of the fuel injection rate. In FIG. 14, the vertical axis represents the fuel injection rate, and the horizontal axis represents the time. In FIG. 14, waveform X and waveform Y of the fuel injection rate show changing behavior of the fuel injection rate for different in-cylinder pressures but the same rail pressure (i.e. the pressure of the fuel supplied to the fuel injection valve). Fuel injection rate waveform X represents the case in which the in-cylinder pressure is a reference in-cylinder pressure serving as a reference (for example, the pressure under the condition in an injector characteristics measuring benchmark test (e.g. 1 Mpa)), and fuel injection rate waveform Y represents the case with the engine in-cylinder pressure in the internal combustion engine in a running state (e.g. 8 Mpa).

As will be seen from FIG. 14, when the in-cylinder pressure increases, the start time of the fuel injection becomes earlier. If the start time of the fuel injection becomes earlier, the fuel injection quantity will increase.

FIG. 15 is a fuel injection rate changing behavior model serving as a model for the changing behavior of the fuel injection rate shown in FIG. 14. The inventors of the present invention modeled the changing behavior of the fuel injection rate shown in FIG. 14 as a trapezoid shown in FIG. 15. In FIG. 15, trapezoid X shown by a solid line is a model for fuel injection rate waveform X in FIG. 14, and trapezoid Y shown by a broken line is a model for fuel injection rate waveform Y in FIG. 14.

In FIG. 15, letting Q be the area of trapezoid X or the required fuel injection quantity, Qr be the area of trapezoid Y or the actual injection quantity, dQ1 be the variation in the fuel injection quantity due to the variation in the fuel injection rate between in the case of reference in-cylinder pressure and in the case of in-cylinder pressure of the engine (i.e. the area within trapezoid X above trapezoid Y in FIG. 15), and dQ2 be the variation in the fuel injection quantity due to the variation in the start time between in the case of reference in-cylinder pressure and in the case of in-cylinder pressure of the engine (i.e. the area within trapezoid Y on the left side of trapezoid X in FIG. 15), the actual injection quantity Qr can be represented by the following formula (1)

$$Qr = Q - dQ1 + dQ2 \tag{1}$$

Therefore, a command value for attaining desired fuel injection is represented by the following formula (2).

$$Q = Qr + dQ1 - dQ2 \tag{2}$$

In FIG. 15, letting A be the length of the upper base of trapezoid X, B be the length of the lower base of trapezoid X, Q' be the height of trapezoid X (i.e. the fuel injection rate in the case of reference in-cylinder pressure), q' be the height of trapezoid Y and C be the length of the portion of the upper base of trapezoid Y that overlaps trapezoid X, dQ1 is represented by the following formula (3)

$$\begin{aligned} dQ1 &= Q - q \\ &= Q - (B+C)q'/2 \\ &= Q - (B + (Aq'/Q' + B(Q'-q')/Q'))q'/2 \\ &= (1 - q'/Q')Q + (A-B)(q'-Q')q'/Q' \end{aligned} \tag{3}$$

In the conventional art, dQ2 in formula (2) is not taken into consideration, and corrected fuel injection rate is obtained by the relationship represented by the following formula (4).

$$Qr = Qq'/Q' \tag{4}$$

Thus, in the conventional art, dQ1 is represented by the following formula (5).

$$\begin{aligned} dQ1 &= Q - Qr \\ &= (1 - q'/Q')Q \end{aligned} \tag{5}$$

Equation (5) lacks the second term in equation (3), and therefore, no consideration has been given to an error corresponding to this term in the conventional art.

In addition, when the rail pressure is low, the change in the fuel injection rate after the start of the fuel injection is moderate. Therefore, the gradient of the left edge of the trapezoid is small and the value (A−B) is large. Thus, in the case that the rail pressure is low, influence of the value (A−B) is significant, and therefore, a large error will be introduced if dQ1 is obtained from equation (5).

[Patent Document 1] Japanese Patent Application Laid-Open No. 9-256886
[Patent Document 2] Japanese Patent Application Laid-Open No. 2000-54889

DISCLOSURE OF INVENTION

The present invention has been made in view of the above-described situation. An object of the present invention is to provide a technology for controlling the fuel injection quantity that changes with changes in the in-cylinder pressure with improved accuracy.

In order to attain the above object, according to the present invention, there is provided a fuel injection control apparatus for an internal combustion engine equipped with a fuel injection valve for directly injecting high pressure fuel supplied by high pressure fuel supply means into a cylinder, comprising:

in-cylinder pressure detection means for detecting or estimating in-cylinder pressure of said cylinder;

time period calculation means for calculating fuel injection time period over which fuel is injected from said fuel injection valve, the fuel injection time period being corrected to compensate a variation in the fuel injection quantity caused by a variation in the fuel injection rate due to a variation in the in-cylinder pressure detected or estimated by said in-cylinder pressure detection means relative to a reference in-cylinder pressure that is stored in advance;

start time variation calculation means for calculating a variation in the fuel injection start time at the in-cylinder pressure detected or estimated by said in-cylinder pressure detection means relative to the fuel injection start time at said reference in-cylinder pressure;

control means for controlling the time period over which fuel is injected from said fuel injection valve based on the fuel injection time period calculated by said time period calculation means and the variation in the fuel injection start time calculated by said start time variation calculation means.

By calculating a fuel injection time period while correcting a variation in the fuel injection quantity caused by a variation in the fuel injection rate and calculating a variation in the fuel injection start time, it is possible to control the fuel injection quantity that changes with changes in the in-cylinder pressure with improved accuracy, and it is possible to attain a target fuel injection quantity irrespectively of the running state of the internal combustion engine.

The above-described apparatus may further include:

fuel pressure detection means for detecting the pressure of the high pressure fuel supplied to said fuel injection valve by said high pressure fuel supply means;

fuel injection quantity characteristic storing means for storing a characteristic, in relation to valve opening time of said fuel injection valve, of the fuel injection quantity injected by said fuel injection valve during the valve opening time in accordance with the pressure of the high pressure fuel supplied to said fuel injection valve by said high pressure fuel supply means;

required fuel injection quantity calculation means for calculating a desired fuel injection quantity based on the running state of the internal combustion engine;

fuel injection rate calculation means for calculating fuel injection rate based on the fuel pressure detected by said fuel pressure detection means and the in-cylinder pressure detected or estimated by said in-cylinder pressure detection means;

fuel injection quantity variation calculation means for calculating a variation in the fuel injection quantity caused by a variation in a second fuel injection rate calculated by said fuel injection rate calculation means based on the in-cylinder pressure detected or estimated by said in-cylinder pressure detection means relative to a first fuel injection rate calculated by said fuel injection rate calculation means based on said reference in-cylinder pressure;

coefficient calculation means for calculating a variation in fuel injection delay time per unit in-cylinder pressure for the fuel pressure detected by said fuel pressure detection means.

In this case, said time period calculation means may calculate the fuel injection time period utilizing said fuel injection quantity characteristic storing means based on the variation in the fuel injection quantity calculated by said fuel injection quantity variation calculation means and the fuel injection quantity calculated by said required fuel injection quantity calculation means, and said start time variation calculation means may calculate the variation in the fuel injection start time based on a variation in the in-cylinder pressure detected or estimated by said in-cylinder pressure detection means relative to said reference in-cylinder pressure and the variation calculated by said coefficient calculation means.

With the above features, it is possible to calculate a correction value based on the reference in-cylinder pressure. Therefore, a characteristic stored in the fuel injection quantity characteristic storing means, for example, a characteristic obtained by an injector characteristics measuring benchmark test, can be applied to an actual internal combustion engine directly.

The above-described apparatus may further includes:

a needle valve provided in said fuel injection valve that moves in the axial direction to effect valve opening and closing operations;

fuel injection quantity estimation means for estimating, when fuel injection by said fuel injection valve is started, the quantity of fuel injected since the valve opening operation of said needle valve is started until said needle valve reaches a full open state, based on the fuel pressure detected by said fuel pressure detection means and the in-cylinder pressure detected or estimated by said in-cylinder pressure detection means;

comparison means for comparing the estimated fuel quantity estimated by said fuel injection quantity estimation means and the fuel injection quantity calculated by said required fuel injection quantity calculation means, wherein, said fuel injection quantity variation calculation means may calculate the variation in the fuel injection quantity using different calculation processes, in accordance with a result of the comparison by said comparison means, between in the case that said fuel injection quantity is less than said estimated fuel quantity and in the case that said fuel injection quantity is more than or equal to said estimated fuel quantity.

As per the above, by using different processes of calculating a variation in the fuel injection quantity depending on whether the needle valve has reached the full open state or not, it is possible to calculate the variation in the fuel injection quantity by a simplified calculation method. Therefore, in the case that a relationship necessary for calculation of the variation in the fuel injection quantity is stored as a map, the data amount of the map can be made minimum.

In the above described apparatus, said fuel injection quantity variation calculation means may calculate the variation in the fuel injection quantity by modeling a change with time in the fuel injection rate as a polygon in a coordinate system and calculating a change in the area of said polygon.

With this feature, it is possible to calculate the variation in the fuel injection quantity more simply.

Furthermore, in the above-described apparatus, said fuel injection quantity variation calculation means may include suction chamber pressure calculation means for calculating pressure in a suction chamber formed in the tip end side of a valve seat on/from which said needle valve is to be received/detached, based on the fuel pressure detected by said fuel pressure detection means and the position of said needle valve;
   unit fuel injection quantity variation calculation means for calculating a variation in the fuel injection quantity per unit in-cylinder pressure based on the fuel injection quantity calculated by said required fuel injection quantity calculation means and the suction chamber pressure calculated by said suction chamber pressure calculation means,
   wherein, when according to a result of the comparison by said comparison means, said fuel injection quantity is less than said estimated fuel injection quantity, said fuel injection quantity variation calculation means may calculate the variation in the fuel injection quantity based on a variation in the in-cylinder pressure detected or estimated by said in-cylinder pressure detection means relative to said reference in-cylinder pressure and the variation in the fuel injection quantity per unit in-cylinder pressure calculated by said unit fuel injection quantity variation calculation means.

With the above features, when the needle valve has not reached the full open state, the variation in the fuel injection quantity can be calculated based on the pressure of the suction chamber. Therefore, correction with improved accuracy can be made possible.

Still further, the above-described apparatus may further include:
   fuel pressure detection means for detecting the pressure of the high pressure fuel supplied to said fuel injection valve by said high pressure fuel supply means;
   fuel injection quantity characteristic storing means for storing a characteristic, in relation to valve opening time of said fuel injection valve, of the fuel injection quantity injected by said fuel injection valve during the valve opening time in accordance with the pressure of the high pressure fuel supplied to said fuel injection valve by said high pressure fuel supply means;
   required fuel injection quantity calculation means for calculating a desired fuel injection quantity based on the running state of the internal combustion engine;
   first virtual fuel pressure calculation means for calculating a first virtual fuel pressure by subtracting a variation in the in-cylinder pressure detected or estimated by said in-cylinder pressure detection means relative to said reference in-cylinder pressure from the fuel pressure detected by said fuel pressure detection means;
   second virtual fuel pressure calculation means for calculating a second virtual fuel pressure by adding a variation in the in-cylinder pressure detected or estimated by said in-cylinder pressure detection means relative to said reference in-cylinder pressure to the fuel pressure detected by said fuel pressure detection means;
   injection delay time calculation means for calculating injection delay time from the time at which a signal for opening said fuel injection valve is generated to the time at which fuel injection by said fuel injection valve is started, based on the fuel pressure detected by said fuel pressure detection means,
   wherein, said time period calculation means may calculate the fuel injection time period utilizing said fuel injection characteristic storing means based on the first virtual fuel pressure calculated by said first virtual fuel pressure calculation means and the fuel injection quantity calculated by said required fuel injection quantity calculation means, and
   said start time variation calculation means may calculate, by means of said fuel injection delay time calculation means, a fuel injection delay time for the fuel pressure detected by said fuel pressure detection means and a fuel injection delay time for the second virtual fuel pressure calculated by said second virtual fuel pressure calculation means and calculates the variation in the fuel injection start time from a difference between those injection delay times.

By introducing a virtual fuel pressure as per the above, it is possible to calculate the time period over which the fuel is injected in a more simple way.

BRIEF DESCRIPTION OF DRAWINGS

FIG. 4 shows, in Part (A), a fuel injection rate changing behavior model in which the changing behavior of the fuel injection rate is modeled as a trapezoid, and shows, in Part (B), a state in which the trapezoid shown in Part (A) is divided into two portions.

BEST MODE FOR CARRYING OUT THE INVENTION

In the following, the best mode for carrying out the present invention will be described in detail based on exemplary embodiments.

Embodiment 1

Figure 1:
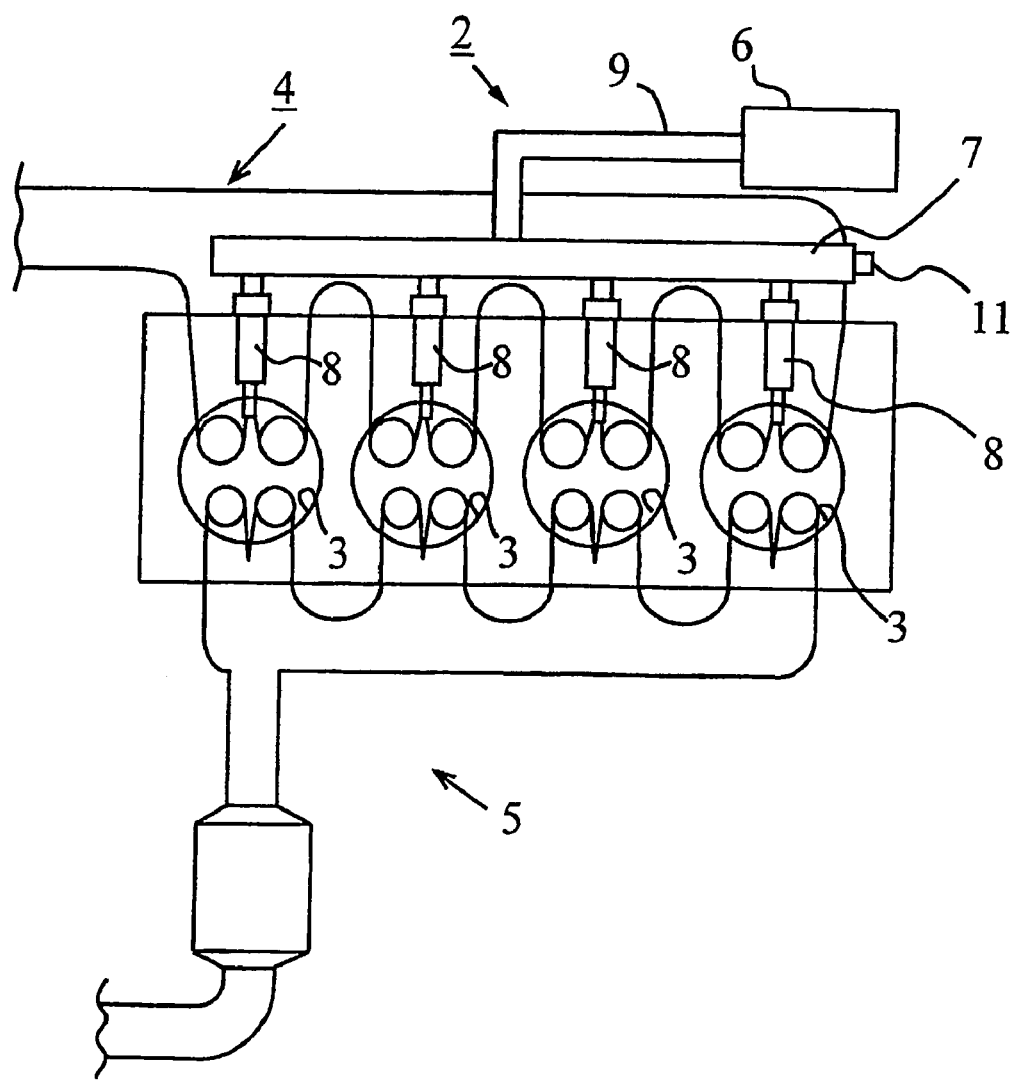
FIG. 1 schematically shows the basic structure of a diesel engine as an internal combustion engine in which a fuel injection control apparatus according to a first embodiment of the present invention is applied.

FIG. 1 schematically shows the basic structure of a diesel engine as an internal combustion engine in which a fuel injection control apparatus according to a first embodiment of the present invention is applied.

As shown in FIG. 1, the internal combustion engine 1 is mainly composed of a fuel supply system 2, cylinders (or combustion chambers) 3, intake passage 4 and exhaust passage 5. The internal combustion engine 1 is an in-line four cylinder diesel engine in which four cycles including intake stroke, compression stroke, explosion stroke (or expansion stroke) and exhaust stroke are repeated to create an output.

The fuel supply system 2 includes a supply pump 6, a common rail 7, fuel injection valves 8, fuel passage 9 etc. The supply pump 6 raises the pressure of the fuel drawn from a fuel tank (not shown) to a high pressure and supplies the fuel to the common rail 7 through the fuel passage 9. The common rail 7 functions as a pressure accumulation chamber for maintaining (or accumulating) the pressure of high pressure fuel supplied from the supply pump 6 at a predetermined pressure and distributes the pressurized fuel to the respective fuel injection valves 8 through the fuel pipes connected to the common rail 7. The high pressure fuel supply means comprises the supply pump 6, the common rail 7 and the fuel passage 9.

The fuel injection valve 8 is an electromagnetically driven on-off valve equipped with a electromagnetic solenoid (not shown) in the interior thereof. The fuel injection valve 8 is opened fitly to supply an appropriate quantity of the fuel pressurized in the common rail 7 into the interior of the cylinder 3 by direct injection at an appropriate timing. The fuel injection valve 8 may be equipped with a piezoelectric actuator instead of the electromagnetic solenoid.

The internal combustion engine 1 is provided with various sensors such as an accelerator position sensor that outputs a signal indicative of the travel of the accelerator pedal (not shown) resulting from depression by the driver, a crank position sensor that outputs a signal indicative of the number of engine revolutions of the crankshaft (not shown), a water temperature sensor that outputs a signal indicative of the temperature of cooling water circulating in the internal combustion engine 1 (the cooling water temperature), an air flow meter outputting a signal indicative of the flow rate of the air introduced into the cylinder 3 through the intake passage 4 (the intake air quantity) and a rail pressure sensor 11 that detects the pressure of the high pressure fuel under pressure in the common rail 7 (the rail pressure). The signals of these sensors are input to an electronic control unit (ECU) 10. The rail pressure sensor 11 constitutes the fuel pressure detection means.

ECU 10 includes a logical operating circuit composed of a central processing unit (CPU), a read only memory (ROM), a random access memory (RAM), a backup RAM and other elements. The ECU 10 performs overall control of various components of the internal combustion engine 1 based on signals from various sensors. For example, the ECU 10 detects the running state of the internal combustion engine 1 to control the opening/closing operation of the fuel injection valves 8.

Furthermore, the ECU 10 executes inputting of signals output from various sensors, calculation of the number of engine revolutions, calculation of the load, calculation of the fuel injection quantity etc. in a basic routine that is to be performed at regular intervals. Various signals input into the ECU 10 and various control values obtained through the calculation by the ECU 10 in the basic routine are temporarily stored in the RAM of the ECU 10. Still further, in an interrupting process that is triggered by, for example, signal inputs from various sensors or switches, lapse of a certain time or input of a pulse signal from a crank position sensor, the ECU 10 reads out various control values from the RAM and executes the fuel injection control or other control in accordance with those control values. The ECU 10 constitutes the fuel injection control apparatus, and constitutes the time period calculation means 51, the start time variation calculation means 52, the control means 53, the fuel injection quantity characteristic storing means 54, the required fuel injection quantity calculation means 55, the fuel injection rate calculation means 56, the fuel injection quantity variation calculation means 57, the coefficient calculation means 58, the fuel injection quantity estimation means 59 and comparison means 60 in FIG. 3 described hereinafter.

Figure 2:
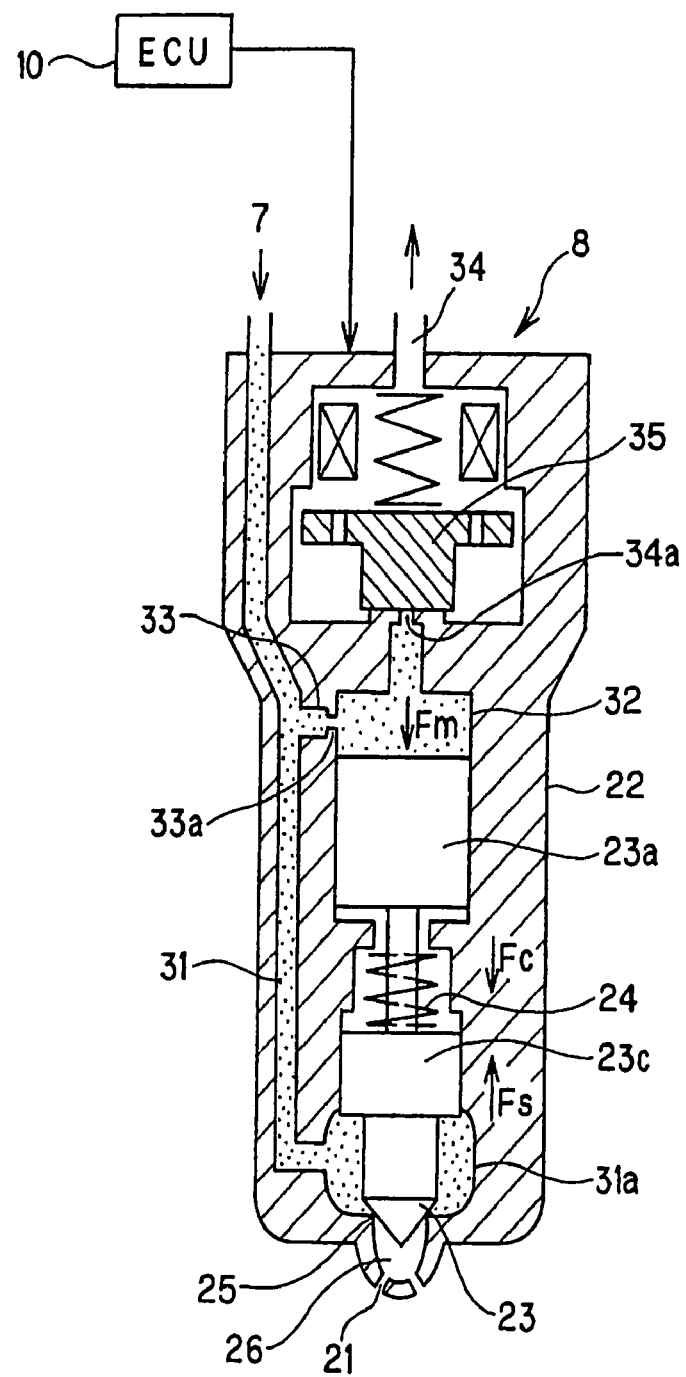
FIG. 2 is a cross sectional view schematically showing a fuel injection valve in the first embodiment of the present invention.

In the following, the fuel injection valve 8 will be more specifically described. FIG. 2 is a cross sectional view schematically showing the fuel injection valve 8 in this embodiment.

As shown in FIG. 2, the fuel injection valve 8 includes a main body 22 having a fuel injection hole 21 at its tip end, a needle-shaped needle valve 23 (i.e. the valve body) and a coil spring 24 that biases the needle valve 23 in the closing direction. The needle valve 23 is disposed in the interior of the main body 22 in such a way as to be movable in the axial direction. The needle valve 23 closes the fuel injection hole 21 when received on a valve seat 25 in its advanced state and opens the fuel injection valve 21 when detached from the valve seat 25 in its retracted state. The fuel injection hole 21 is provided at a suction chamber 26 provided in the tip end side of the valve seat 25 in the main body 22.

Furthermore, the fuel injection valve 8 includes a first fuel supply passage 31 for introducing high pressure fuel supplied from the common rail 7 with a predetermined pressure to the fuel injection hole 21, a control chamber 32 for receiving high pressure fuel to press the needle valve 23 in the closing direction, a second fuel supply passage 33 branching from the first fuel supply passage 31 for introducing high pressure fuel supplied from the common rail 7 with a predetermined pressure to a control chamber 32 and a fuel discharge passage 34 for discharging the high pressure fuel in the control chamber 32 to reduce the fluid pressure in the control chamber 32.

In the second fuel supply passage 33, an inlet orifice 33a that determines the flow rate of the fuel flowing into the control chamber 32 is provided. In the fuel discharge passage 34, an outlet orifice 34a that determines the fuel discharge amount is provided. The ratio of the cross sectional area of the inlet orifice 33a and the outlet orifice 34a is designed in such a way that the cross sectional area of the outlet orifice 34a is larger than that of the inlet orifice 33a. For example, the ratio is 2:3.

The needle valve 23 has a main piston 23a that faces the control chamber 32 and receives the fuel pressure in the control chamber 32 to move the needle valve 23 downwardly. A sub piston 23c is provided in the fuel injection hole 21 side of the needle valve 23 relative to the main piston 23a. At a position in the first fuel supply passage 31 leading to the fuel injection hole 21, there is provided a fuel reservoir 31a in such a way as to face the sub piston 23c. Thus, the pressure of the fuel in the fuel reservoir 31a acts on the sub piston 23c to press the needle valve 23 in the opening direction (i.e. the upward direction in FIG. 2). The area Ss over which the sub piston 23c receives the pressure of the fuel in the fuel reservoir 31a is designed to be smaller than the area Sm over which the main piston 23a receives the pressure of the fuel in the control chamber 32. In addition, a coil spring 24 for biasing the needle valve 23 in the closing direction is provided in the main piston 23a side of the sub piston 23c.

Letting Fm be the pressing force exerted on the main piston 23a by the pressure of the fuel in the control chamber 32, Fs be the pressing force exerted on the sub piston 23c by the pressure of the fuel in the fuel reservoir 31a, Fc be the biasing force of the coil spring 24, inequalities Fm+Fc>Fs and Fc<Fs hold in the steady state.

Furthermore, a back pressure control valve 35 for sealing, in its closed state, high pressure fuel in the control chamber 32 and for letting, in its opened state, fuel out of the control chamber 32 to the fuel discharge passage 34 is provided intervening in the fuel discharge passage 34 from the control chamber 32. The back pressure control valve 35 is composed of an electromagnetic valve and provide in the interior of the main body 22. When the back pressure control valve 35 is in the closed state, the pressure of the fuel in the control chamber 32 increases to press the main piston 23a to move the needle valve 23 downwardly in cooperation with the biasing force of the coil spring 24.

In this process, although fuel having the pressure same as the pressure in the control chamber 32 is introduced from the first fuel supply passage 31 into the fuel reservoir 31a to press the sub piston 23c, its pressing force Fs cannot match the cooperative force Fm+Fc. Consequently, the needle valve 23 is maintained in the state in which it closes the fuel injection hole 21.

After that, when the back pressure control valve 35 is opened, fuel is discharged from the control chamber 32 through the fuel discharge passage 34. In this process, since the outlet orifice 34a is designed to be larger than the inlet orifice 33a, the quantity of the fuel flowing out of the control chamber 32 is more than the quantity of the fuel flowing into the control chamber 32. Consequently, the fuel pressure in the control chamber 32 falls.

Then at the time when Fm+Fc<Fs is established, the needle valve 23 lifts (i.e. moves upward, and opens the valve), so that the fuel injection hole 21 is opened and the fuel injection is started.

Here, a fuel injection valve drive control process for driving the fuel injection valve 8 will be described. The fuel injection valve drive control process is executed by the ECU 10.

Before fuel injection, the ECU 10 keeps the back pressure control valve 35 in the closed state, and the interior of the control chamber 32 is filled with high pressure fuel introduced from the common rail 7 through the second fuel supply passage 33. Thus, the piston 23a of the needle valve 23 is in the lowered position and the fuel injection hole 21 is closed.

When the time for fuel injection comes, the back pressure control valve 35 is opened by a command from the ECU 10, and high pressure fuel in the interior of the control chamber 32 is discharged through the fuel discharge passage 34. Consequently, the fuel pressure in the control chamber 32 falls, so that the needle valve 23 lifts to open the fuel injection hole 21.

When a predetermined fuel injection time elapses after that, the back pressure valve 35 is closed by the ECU 10. Then, high pressure fuel flows into the control chamber 32 and is sealed therein. Thus, the pressure in the control chamber 32 rises, so that the needle valve 23 goes down to close the fuel injection hole 21.

Figure 3:
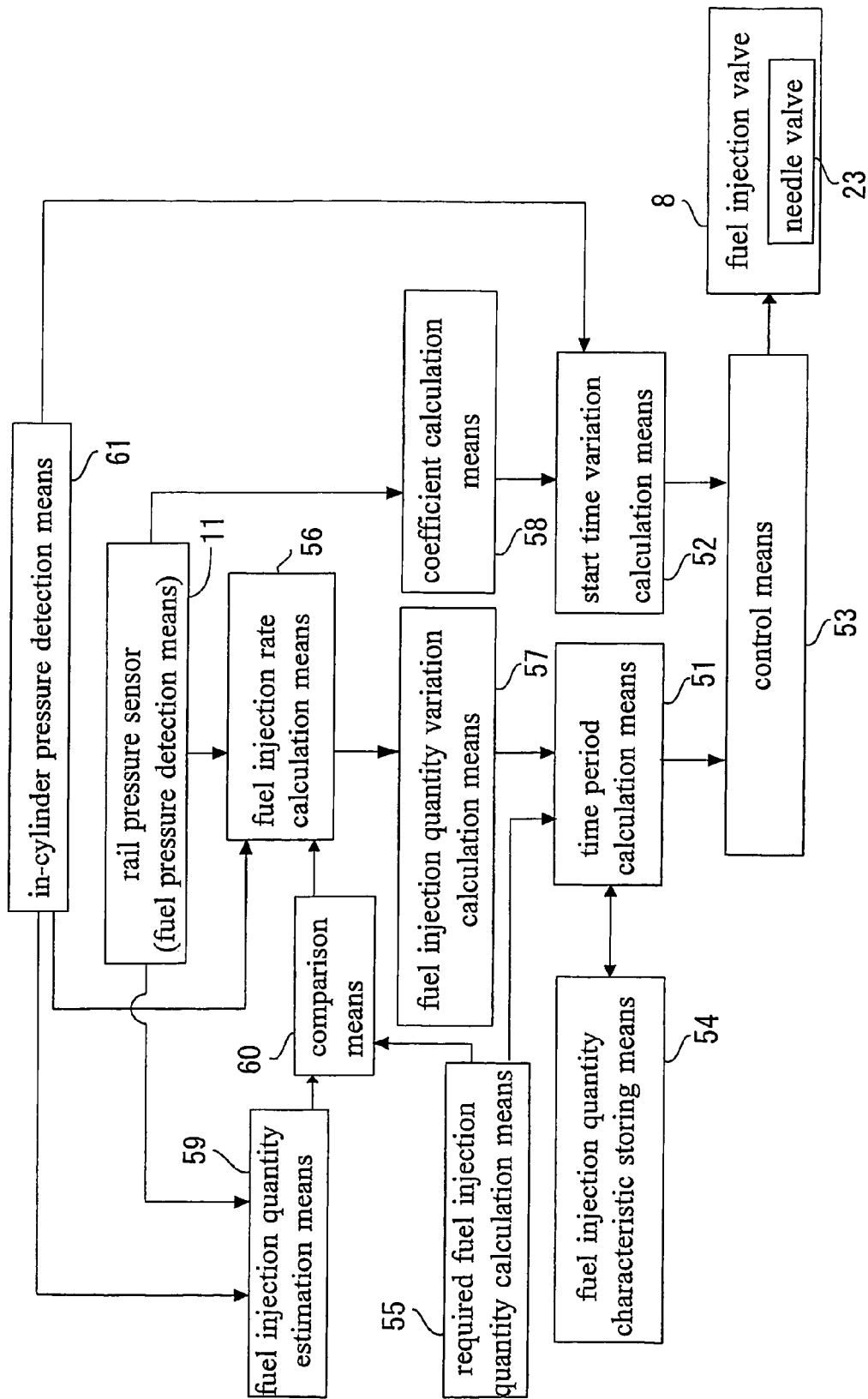
FIG. 3 is a block diagram showing the fuel injection control apparatus according to the first embodiment of the present invention.

FIG. 3 is a block diagram of the fuel injection control apparatus according to this embodiment. As shown in FIG. 3, the fuel injection control apparatus according to this embodiment is equipped with a time period calculation means 51, start time variation calculation means 52 and control means 53.

The time period calculation means 51 calculates the fuel injection time period being corrected to compensate a variation in the fuel injection quantity caused by a variation in the fuel injection rate due to a variation in the in-cylinder pressure detected or estimated by the in-cylinder pressure detection means 61 relative to a reference in-cylinder pressure that is stored in advance.

The start time variation calculation means 52 calculates a variation in the fuel injection start time at the in-cylinder pressure detected or estimated by in-cylinder pressure detection means 61 relative to the fuel injection start time at the reference in-cylinder pressure described later.

The control means 53 controls the time period over which fuel is injected from the fuel injection valve 8 based on the fuel injection time period calculated by the time period calculation means 51 and the variation in the fuel injection start time calculated by the start time variation calculation means 52.

The fuel injection control apparatus according to this embodiment is further equipped with the fuel injection quantity characteristic storing means 54 for storing a characteristic, in relation to valve opening time of the fuel injection valve 8, of the fuel injection quantity injected by the fuel injection valve 8 during the valve opening time in accordance with the pressure of the high pressure fuel supplied to the fuel injection valve 8; the required fuel injection quantity calculation means 55 for calculating a desired fuel injection quantity based on the running state of the internal combustion engine; the fuel injection rate calculation means 56 for calculating fuel injection rate based on the fuel pressure detected by the rail pressure sensor 11 and the in-cylinder pressure detected or estimated by the in-cylinder pressure detection means 61; the fuel injection quantity variation calculation means 57 for calculating a variation in the fuel injection quantity caused by a variation in a second fuel injection rate calculated by the fuel injection rate calculation means 56 based on the in-cylinder pressure detected or estimated by the in-cylinder pressure detection means 61 relative to a first fuel injection rate calculated by the fuel injection rate calculation means 56 based on the reference in-cylinder pressure; the coefficient calculation means 58 for calculating a variation in fuel injection delay time per unit in-cylinder pressure for the fuel pressure detected by the rail pressure sensor 11.

The time period calculation means 51 calculates the fuel injection time period utilizing the fuel injection quantity characteristic storing means 54 based on the variation in the fuel injection quantity calculated by the fuel injection quantity variation calculation means 57 and the fuel injection quantity calculated by the required fuel injection quantity calculation means 55.

The start time variation calculation means 52 calculates the variation in the fuel injection start time based on a variation in the in-cylinder pressure detected or estimated by the in-cylinder pressure detection means 61 relative to the reference in-cylinder pressure and the variation calculated by the coefficient calculation means 58.

Furthermore, the fuel injection quantity estimation means 59 estimates the quantity of fuel injected since the valve opening operation of the needle valve 23 is started until the needle valve 23 reaches a full open state, based on the fuel pressure detected by the rail pressure sensor 11 and the in-cylinder pressure detected or estimated by the in-cylinder pressure detection means 61.

The comparison means 60 compares the estimated fuel quantity estimated by the fuel injection quantity estimation means 59 and the fuel injection quantity calculated by the required fuel injection quantity calculation means 55.

The fuel injection quantity variation calculation means 57 calculates the variation in the fuel injection quantity using different calculation processes, in accordance with a result of the comparison by the comparison means 60, between in the case that said fuel injection quantity is less than the estimated fuel quantity and in the case that said fuel injection quantity is more than or equal to the estimated fuel quantity.

In the following, a method of correcting the fuel injection quantity will be described in particular.

In the case that fuel is directly injected into the cylinder 3 by the fuel injection valve 8, the in-cylinder pressure serving as the back pressure changes in accordance with the running state of the engine. Therefore, even if the ECU 10 commands to inject a predetermined quantity of fuel, variations are generated in the actual fuel injection quantity.

The internal combustion engine 1 is a direct injection internal combustion engine equipped with the fuel injection valve 8 for injecting fuel into the cylinder directly, and so the fuel injection hole 21 is disposed in the interior of the cylinder 3. When the fuel injection hole 21 is opened, as described above, the back pressure control valve 35 is opened by a command from the ECU 10 and high pressure fuel in the interior of the control chamber 32 is discharged through the fuel discharge passage 34. Thus, the fuel pressure in the control chamber 32 falls, so that the needle valve 23 will lift. In this process, since the fuel injection hole 21 is disposed in the interior of the cylinder 3, the in-cylinder pressure is exerted on the needle valve 23. Since the in-cylinder pressure acts on the needle valve 23 in the lifting direction, the opening timing of the fuel injection hole 21 is advanced, namely the fuel injection is started at an earlier time.

In view of this, in this embodiment, a variation in the fuel injection quantity caused by a variation in the fuel injection rate at the in-cylinder pressure of the engine (a detected or estimated pressure in the running state of the internal combustion engine) relative to the fuel injection rate at a reference in-cylinder pressure (for example, the condition in an injector characteristics measuring benchmark test (e.g. 1 Mpa)) is calculated (or estimated) and, in addition, a variation in the fuel injection start time is corrected to control the power supply time during which electric power is supplied to the fuel injection valve 8 (i.e. to the back pressure control valve 3) (namely, the time period over which fuel is injected by the fuel injection valve 8) is controlled. In other words, the time period over which fuel is injected from the fuel injection valve 8 is controlled by the control means 53 based on the fuel injection time period calculated by the time period calculation means 51 and the variation in the fuel injection start time calculated by the start time variation calculation means 52.

Firstly, a method for calculating a variation in the fuel injection quantity due to a variation in the fuel injection rate will be described.

Figure 15:
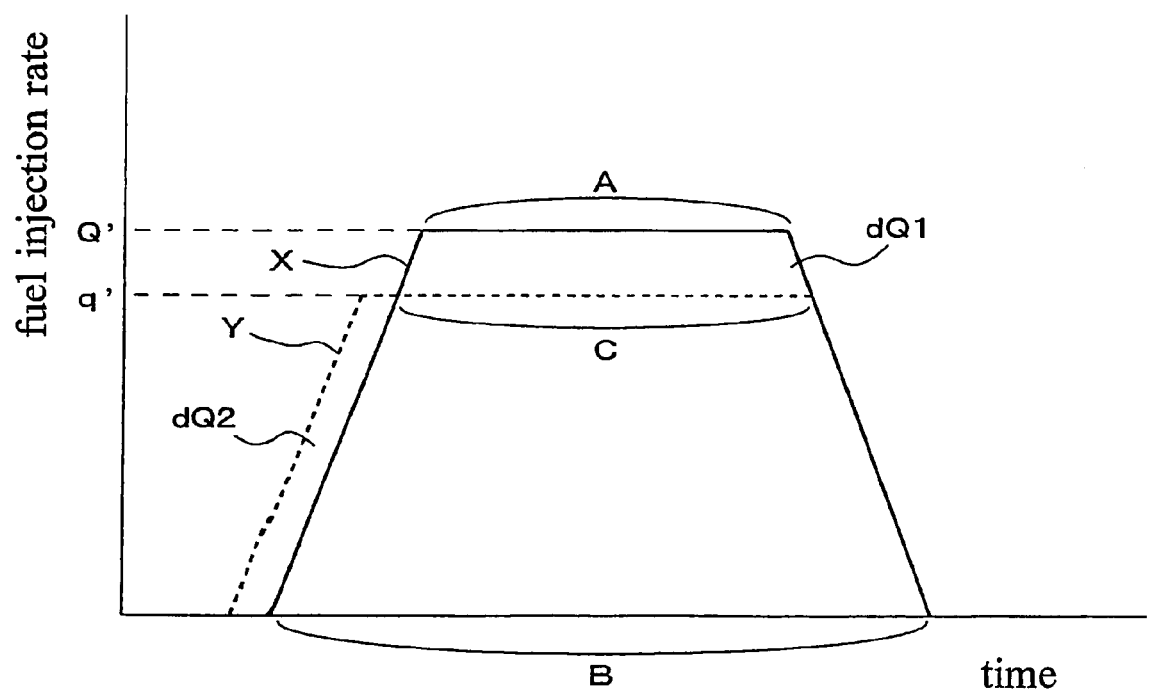
FIG. 15 shows a fuel injection rate changing behavior model serving as a model for the changing behavior of the fuel injection rate.

In this embodiment, a fuel injection rate changing behavior model in which the changing behavior of the fuel injection rate is modeled in a similar manner as FIG. 15 that was referred to in the description of background arts is used (see FIG. 4), and correction of the fuel injection quantity is performed utilizing the fuel injection rate changing behavior model.

In addition, in this embodiment, the calculation process is switched depending on whether the lifting distance (moving distance) of the needle valve 23 reaches one of the fully lifted states (the position at which the needle valve 23 lifts (opens) completely or is in the fully opened state) or not, Wherein, the needle valve 23 lifts in accordance with the desired fuel injection quantity (requested fuel injection quantity) based on the running condition of the engine.

In other words, the calculation process is switched between in the case in which the fuel injection was effected after or at the same time when the needle valve 23 had reached the fully lifted state and in the case in which the execution of the fuel injection was completed before the needle valve 23 had reached the fully lifted state. In connection with this, determination as to whether the needle valve had reached the fully lifted state is made by comparing a fuel injection quantity calculated by the required fuel injection quantity calculation means 55 and an estimated fuel quantity calculated by the fuel injection quantity estimation means 59 (a fuel quantity supposed to be injected until the needle valve 23 reaches the fully lifted state, which is estimated based on the fuel pressure detected by the rail pressure sensor 11 and the in-cylinder pressure detected or estimated by the in-cylinder pressure detection means 61 (which will be described later)) by the comparison means 60. Based on the result of the comparison by the comparison means 60, a variation in the fuel injection quantity is calculated using calculation process that is different between in the case in which the fuel injection quantity is less than or equal to the estimated fuel quantity and in the case in which the fuel injection quantity is more than the estimated fuel quantity. In the following both of the above cases will be described.

First, a description will be made on the case in which the fuel injection was effected after or at the same time when the needle valve 23 had reached the fully lifted state.

Part (A) in FIG. 4 shows a fuel injection rate changing behavior model in which the changing behavior of the fuel injection rate is modeled as a trapezoid. Part (B) of FIG. 4 shows a state in which the trapezoid shown in Part (A) in FIG. 4 is divided into two portions.

Figure 14:
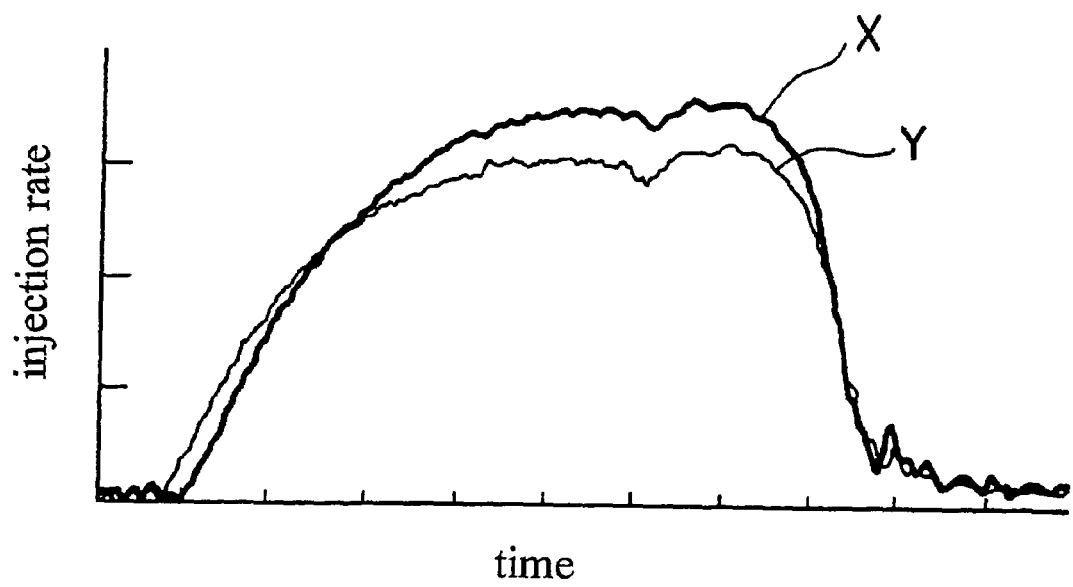
FIG. 14 is a graph showing a changing behavior of fuel injection rate.

In FIG. 4, trapezoid X shown by the solid line is a model for the fuel injection rate waveform X (in the case of reference in-cylinder pressure) shown in FIG. 14, as with FIG. 15, and trapezoid Y shown by the broken line is a model for the fuel injection rate waveform Y (in the case of the engine in-cylinder pressure) shown in FIG. 14.

Position (coordinates) a shown in FIGS. 4(A) and 4(B) is set to represent the fuel injection rate at the time when the needle valve 23 reaches the fully lifted state. An additional line is drawn from this position a parallel to the right edge of trapezoid X, so that the trapezoid X is divided into a triangle X1 and a parallelogram X2 as shown in Part (B) in FIG. 4

Here, as shown in FIGS. 4(A) and 4(B), the vertexes of trapezoid X are designated by a, b, c and d, and the vertexes of trapezoid Y are designated by e, f, g and h. In addition the intersection point of the left edge ab of trapezoid X and the upper base eh of trapezoid Y is designated by i, the intersection point of the additional line drawn from vertex a parallel to the right edge dc and the lower base bc is designated by j, and the intersection point of the left edge aj of parallelogram X2 and the upper base eh of trapezoid Y is designated by k.

The variation $\Delta Q$ in the fuel injection quantity with a change in the fuel injection rate is calculated by the following equation (6). Here, the variation $\Delta Q$ of the fuel injection quantity with a change in the fuel injection rate corresponds to the area of trapezoid aihd. The variation $\Delta Q$ of the fuel injection quantity can be represented as the sum of the variation $\Delta q1$ until the needle valve 23 reaches the fully lifted state (the area of triangle aik) and the variation $\Delta q2$ after the needle valve has reached the fully lifted state (the area of parallelogram akhd).

Namely, the variation $\Delta Q$ in the fuel injection quantity is represented as follows.

$$\Delta Q = \Delta q1 + \Delta q2 \quad (6)$$

Here, the fuel injection quantity at the time when the needle valve 23 reached the fully lifted state, or the area of triangle abj is represented by Qfl, the required fuel injection quantity, or the area of trapezoid X is represented by Q, the fuel injection rate at the reference in-cylinder pressure, or the height of trapezoid X is represented by Q', and the fuel injection rate at the in-cylinder injection, or the height of trapezoid Y is represented by q'. Then, the height of triangle aik and parallelogram akhd is represented by (Q'–q') and the area of parallelogram ajcd is represented by (Q–Qfl). Therefore, the variations $\Delta q1$ and $\Delta q2$ can be calculated by the following formulas (7) and (8) based on the ratio of the areas.

$$\Delta q1 = Qfl \times (1 - q'/Q')^2 \quad (7)$$

$$\Delta q2 = (Q - Qfl) \times (1 - q'/Q') \quad (8)$$

Here, the fuel injection rate can be interpreted as an orifice flow, and the fuel injection rates Q' and q' can be calculated by the following formulas (9) and (10) respectively. In connection with this, the orifice coefficient is represented by C0, the injection hole area (i.e. the area of the aperture of the fuel injection valve) is represented by A, the rail pressure is represented by Pcr, the in-cylinder pressure at the time of starting the fuel injection is represented by Pcl, the reference in-cylinder pressure is represented by P0 and the density of the fuel is represented by $\rho$.

$$Q' = C0 \times A \times (2 \times (Pcr - P0)/\rho)^{1/2} \quad (9)$$

$$q' = C0 \times A \times (2 \times (Pcr - Pcl)/\rho)^{1/2} \quad (10)$$

Therefore, the variation ratio (q'/Q') of the fuel injection rate can be represented by the following formula (11).

$$q'/Q' = ((Pcr - Pcl)/(Pcr - P0))^{1/2} \quad (11)$$

In the case that the fuel injection is effected after or at the same time when the needle valve 23 has reached the fully lifted state, a variation $\Delta Q$ in the fuel injection quantity caused by a change in the fuel injection rate can be calculated by the above-described method.

Next, a description will be made of the case in which the fuel injection was completed before the needle valve 23 reached the fully lifted state.

Figure 5:
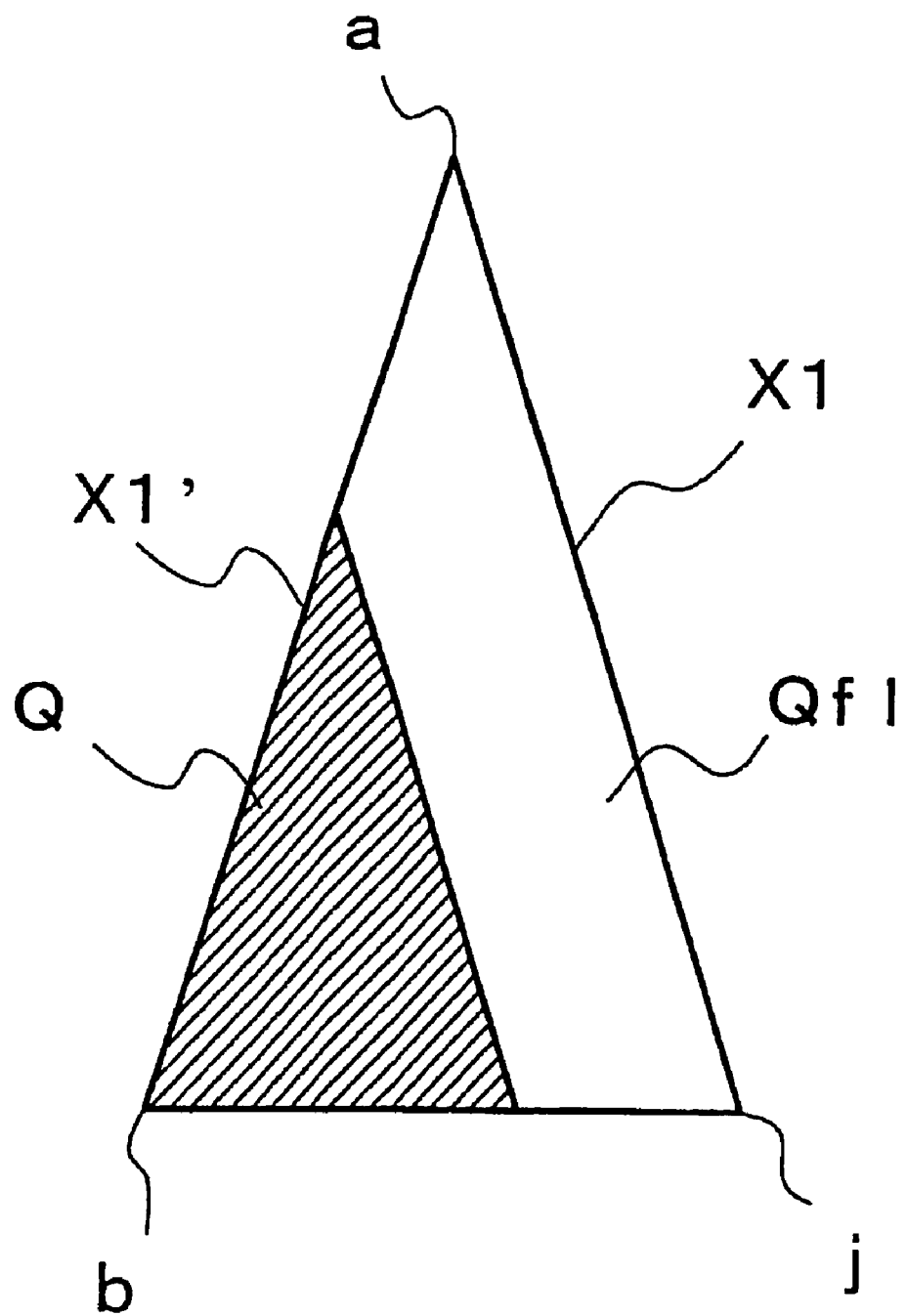
FIG. 5 is a diagram for illustrating a method of calculating a variation in the fuel injection quantity in the case that the fuel injection was completed before the needle valve reached the fully lifted state.

FIG. 5 is a diagram for illustrating a method of calculating a variation in the fuel injection quantity in the case that the fuel injection was completed before the needle valve 23 reached the fully lifted state.

In FIG. 5, triangle X1 is a model for the waveform of the fuel injection rate at the time when the needle valve 23 reached the fully lifted state as with triangle X shown in Part (B) in FIG. 4. The hatched triangle X1' is a model for the waveform of the fuel injection rate in the case that the fuel injection was completed before the needle valve 23 had reached the fully lifted state.

The variation $\Delta Q1$ in the fuel injection quantity in the case that the fuel injection was completed before the needle valve 23 reached the fully lifted state can be obtained based on the ratio of the area of triangle X1 and the area of triangle X1'.

The areas of triangle X1 is represented by Qfl, and the area of triangle X1' corresponds to the fuel injection quantity Q as described above. Thus, the ratio of the areas is represented by the following formula (12).

$$\Delta Q1/\Delta q1 = Q/Qfl \quad (12)$$

Therefore, the variation $\Delta Q1$ in the fuel injection quantity in the case that the fuel injection was completed before the needle valve 23 reached the fully lifted state can be represented by the following formula (13).

$$\Delta Q1 = Q \times (1 - q'/Q')^2 \quad (13)$$

Next, correction of the variation in the fuel injection start time will be described.

Figure 6:
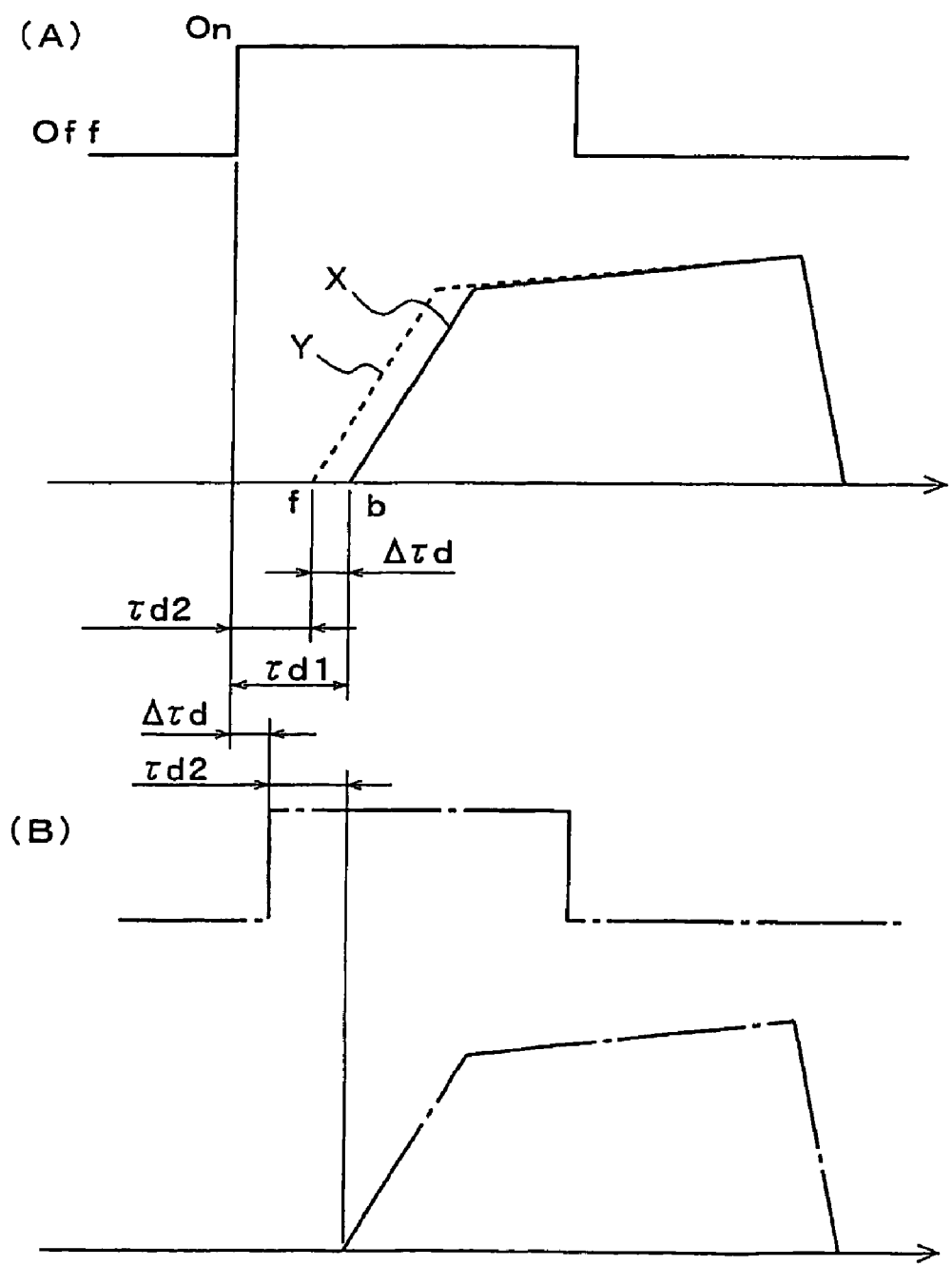
FIG. 6 is a diagram for illustrating correction of the variation in the fuel injection start time; Part (A) of FIG. 6 shows a relationship between the driving signal and the fuel injection rate before the correction, and Part (B) of FIG. 6 shows a relationship between the driving signal and the fuel injection rate after the correction.

FIG. 6 is a diagram for illustrating the correction of the variation in the fuel injection start time. Part (A) of FIG. 6 shows the relationship between the driving signal and the fuel injection rate before the correction. Part (B) of FIG. 6 shows the relationship between the driving signal and the fuel injection rate after the correction. In both Part (A) and Part (B) of FIG. 6, the upper curve represents the driving signal and the lower curve represents the fuel injection rate. In part (A) of FIG. 6 also, the waveform X of the fuel injection rate at the reference in-cylinder pressure is shown by the solid line and the waveform Y of the fuel injection rate at the in-cylinder pressure of the engine is shown by the broken line, in a similar manner as in FIG. 4. Reference signs b and f in Part (A) of FIG. 6 correspond to reference signs b and f in Part (A) of FIG. 4 respectively.

As will be seen from Part (A) of FIG. 6, in the case of the reference in-cylinder pressure, there is a time delay $\tau d1$ before the fuel injection is started after generation of the fuel injection signal by the ECU 10. On the other hand, in the case of the in-cylinder injection, there is a time delay $\tau d2$ before the fuel injection is started after generation of the fuel injection signal, namely, the fuel injection is started earlier than in the case of reference in-cylinder pressure by a time $\Delta \tau d$ (=$\tau d1 - \tau d2$). In the following, time $\tau d1$ or $\tau d2$ will be sometimes referred to as the fuel injection delay time id.

Figure 7:
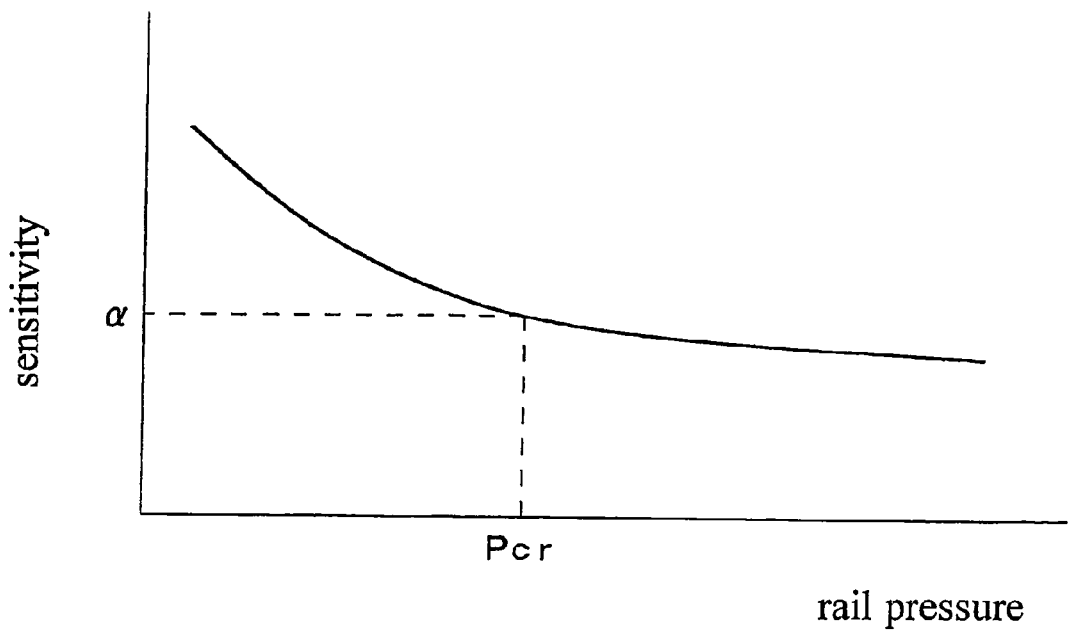
FIG. 7 shows the relationship between the proportionality coefficient (or the sensitivity) a and the rail pressure Pcr in the first embodiment of the present invention.
Figure 8:
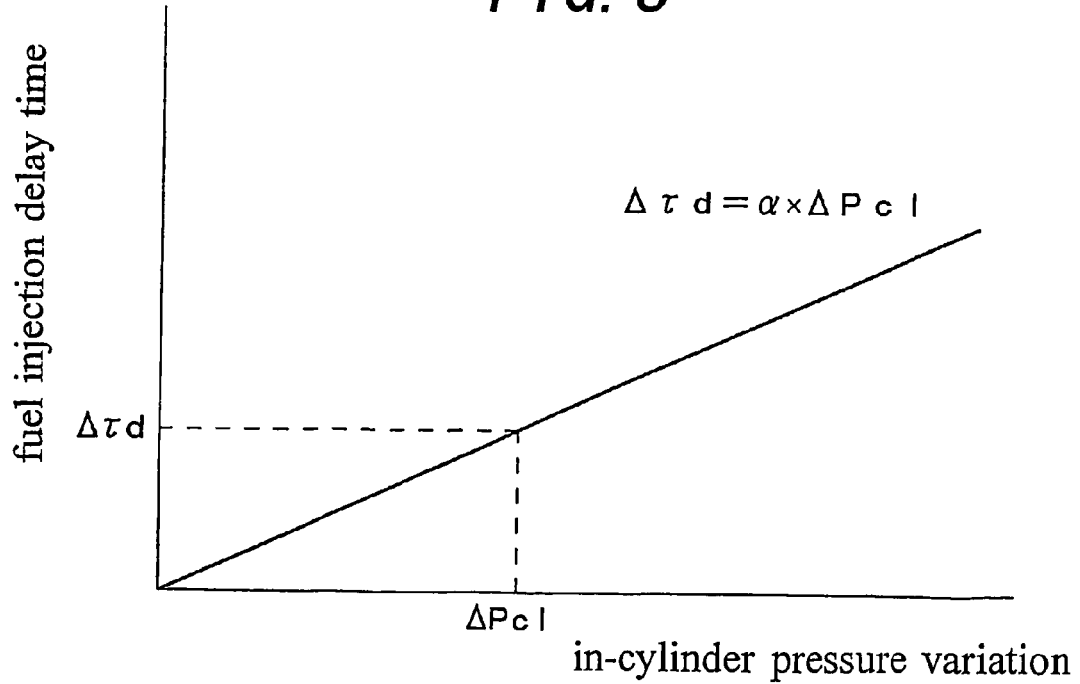
FIG. 8 shows the relationship between variations in the fuel injection delay time $\Delta\tau d$ and variations in the in-cylinder pressure $\Delta Pcl$.

It is already known that the time id is substantially proportional to the variation in the in-cylinder pressure and the proportionality coefficient (i.e. the sensitivity of the variation of the fuel injection delay time id) a varies depending on the rail pressure Pcr. Their relationship is shown in FIGS. 7 and 8. FIG. 7 shows the relationship between the proportionality coefficient (or the sensitivity) a and the rail pressure Pcr (specifically, the variation in the fuel injection delay time per unit in-cylinder pressure relative to the rail pressure). FIG. 8 shows the relationship between the variation in the fuel injection delay time id (time $\Delta \tau d$) and the variation in the in-cylinder pressure $\Delta Pcl$ (=Pcl(engine in-cylinder pressure)–Pcl' (reference in-cylinder pressure)).

Thus, $\Delta\tau d$ can be obtained from the following formula (14) by calculating the rail pressure Pcr and the variation in the in-cylinder pressure (Pcl–Pcl'). In connection with this, it is preferable that the relationship between the rail pressure Pcr and the proportionality coefficient $\alpha$ be prepared as a map in advance. Such a map constitutes the coefficient calculation means 58.

$$\Delta\tau d = \alpha \times (Pcl - Pcl') \tag{14}$$

As shown in Part (B) of FIG. 6, it is possible to correct a change in the fuel injection quantity caused by a change in the fuel injection start time by shortening a signal for opening the fuel injection valve 8 by time $\Delta\tau d$ obtained by formula (14). Furthermore, it is possible to correct the fuel injection timing, which may be made earlier by the influence of in-cylinder pressure, to a desired fuel injection timing by delaying the fuel injection timing by $\Delta\tau d$.

As described above, according to the present invention, it is possible to calculate the variation in the fuel injection quantity caused by a change in the fuel injection rate and to calculate the variation in the fuel injection start time. In the following, a process of controlling the power supply time over which electric power is supplied to the fuel injection valve 8 in order to open the fuel injection valve 8 will be described.

Figure 9:
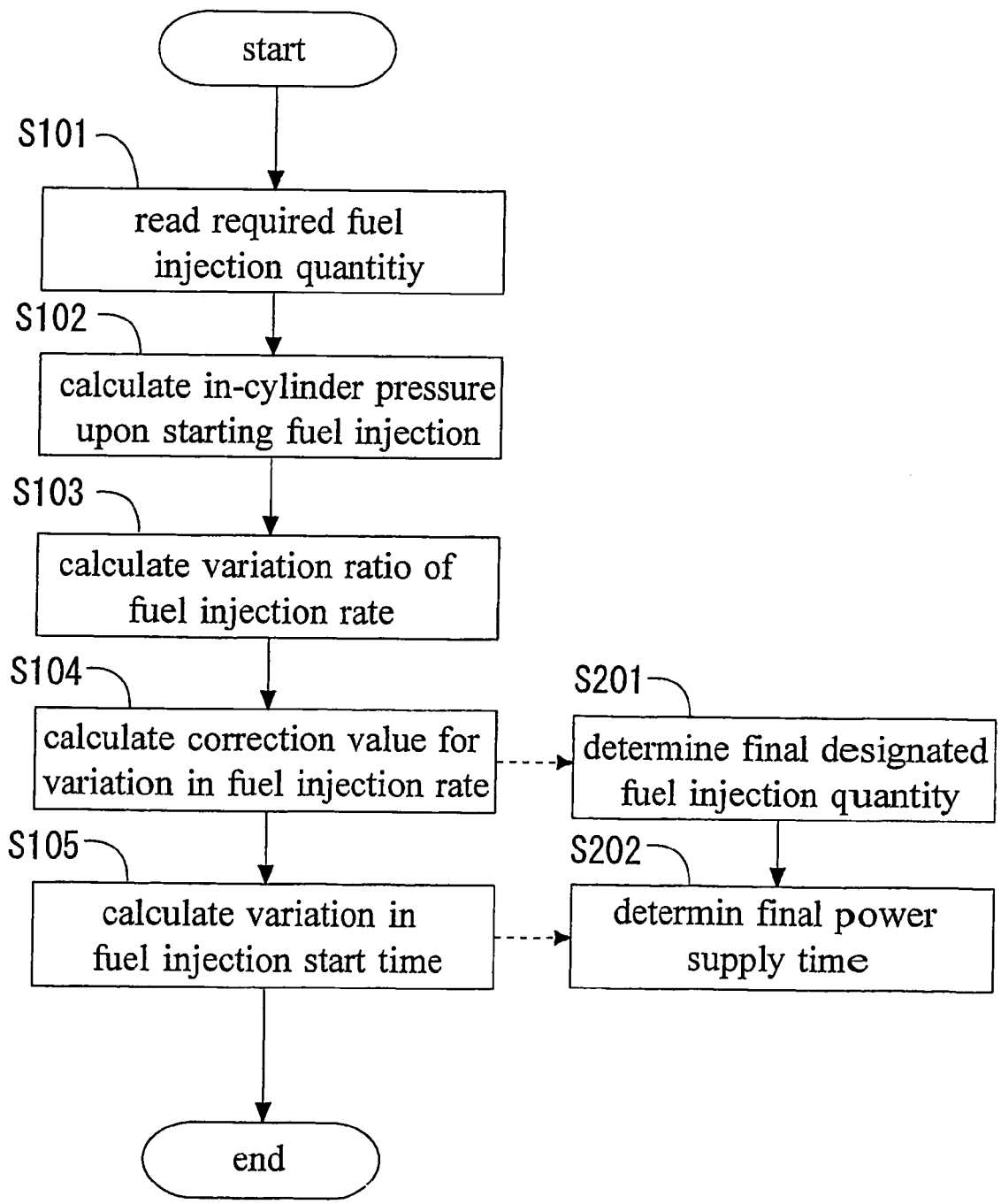
FIG. 9 is a flow chart of a process of calculating correction value of the fuel injection quantity in the first embodiment of the present invention.

FIG. 9 is a flow chart for illustrating a process of calculating a correction value for the fuel injection quantity.

Firstly, in step S101, a required fuel injection quantity is read by the ECU 10 in accordance with the running state of the internal combustion engine 1. This corresponds to calculation of a required fuel injection quantity by the required fuel injection quantity calculation means 55.

Next in step S102, the in-cylinder pressure (the in-cylinder pressure of the engine) at the time when the fuel injection is started is calculated. The calculation of the in-cylinder pressure may be implemented by directly detecting the in-cylinder pressure by detection means provided for detecting the pressure in the cylinder 3 or by estimating the in-cylinder pressure. The in-cylinder pressure can be estimated based on, for example, the pressure in the intake passage 4 and the ratio of the interior volume of the cylinder (i.e. the ratio of the volume during the fuel injection and the volume at the bottom dead center). This corresponds to detection of the in-cylinder pressure of the cylinder 3 by the in-cylinder pressure detection means 61.

Next in step S103, the ratio of variation of the fuel injection rate is calculated. The ratio of variation of the fuel injection rate is calculated by formula (11) presented before. This corresponds to calculation of the fuel injection rate by the fuel injection rate calculation means 56.

Next in step S104, the variation in the fuel injection quantity (or the correction value for the variation in the fuel injection rate) caused by a change in the fuel injection rate is calculated. This corresponds to calculation of the variation in the fuel injection quantity by the fuel injection quantity variation calculation means 57. This calculation is performed in accordance with the above-described method (calculation using formula (6) and formula (13)), and its result is taken into a step of determining a final designated fuel injection quantity that is executed in another routine. This step will be referred to as step S201 for facilitating description. In step S201, a final designated fuel injection quantity is calculated by correcting the required fuel injection quantity based on the variation in the fuel injection quantity calculated in step S104.

In step S105 succeeding step S104, the variation in the fuel injection start time is calculated by the start time variation calculation means 52. This calculation is executed in accordance with the above-described method, and its result is taken into a step of determining a final power supply time that is executed in another routine. This step will be referred to as step S202 to facilitating description.

In step S202, a power supply time is calculated based on the required fuel injection quantity after correction calculated in step S201 and the power supply time is corrected based on the variation in the fuel injection start time calculated in step S105. Thus, the final power supply time is determined.

Here, it is preferable that the relationship between the power supply time (i.e. the time period $\tau$ during which the fuel injection valve 8 is opened) and the fuel injection quantity (Q) be obtained in advance by experiments and prepared as a $\tau$–Q characteristic in the form of a map. The power supply time can be calculated based on the required fuel injection quantity after correction using that $\tau$–Q map. Then, it is possible to determine the final power supply time by increasing or decreasing the power supply time by a value corresponding to the variation in the fuel injection start time. The aforementioned map constitutes the fuel injection quantity characteristic storing means 54.

Fuel injection with an accurate quantity can be attained by applying the final power supply time thus determined as power supply time to the fuel injection valve 8. It should be understood that no limitation is placed on the type of the above-described fuel injection valve 8 and this embodiment can be preferably applied to an injection valve driven by a solenoid and an injection valve driven by a piezoelectric element. In addition, this embodiment can be preferably applied to a direct drive injection valve having no control chamber by setting the variation in the fuel injection delay time $\tau d$ as 0 (no variation).

Embodiment 2

Figure 10:
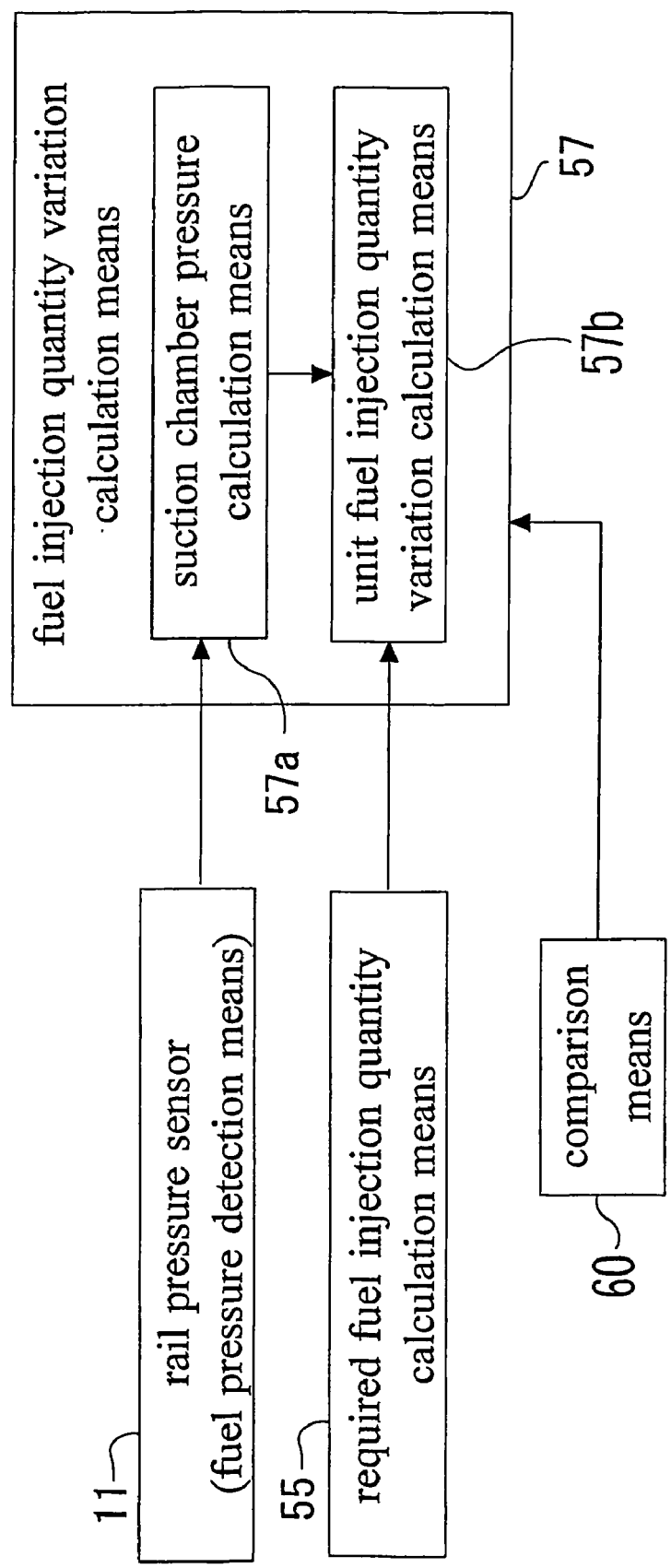
FIG. 10 is a block diagram showing fuel injection quantity variation calculation means and related portions in the second embodiment of the present invention.

In the second embodiment of the present invention, in the case that execution of the fuel injection is completed before the lift amount of the needle valve 23 reaches the full lift, the fuel injection quantity is corrected in accordance with a method different from the method described in connection with the first embodiment. FIG. 10 is a block diagram showing the fuel injection quantity variation calculation means 57 and related portions in this embodiment. In this embodiment, the ECU 10 constitutes the suction chamber pressure calculation means 57*a* and the unit fuel injection quantity variation calculation means 57*b*.

The fuel injection quantity variation calculation means 57 is equipped with a suction chamber pressure calculation means 57*a* for calculating pressure in a suction chamber 26 formed in the tip end side of a valve seat on/from which the needle valve 23 is to be received/detached, based on the fuel pressure detected by the rail pressure sensor 11 and the position of said needle valve 23; the unit fuel injection quantity variation calculation means 57*b* for calculating a variation in the fuel injection quantity per unit in-cylinder pressure based on the fuel injection quantity calculated by the required fuel injection quantity calculation means 55 and the suction chamber pressure calculated by the suction chamber pressure calculation means 57*a*.

When according to a result of the comparison by the comparison means 60, the fuel injection quantity is less than the estimated fuel injection quantity, the fuel injection quantity variation calculation means 57 calculates the variation in the fuel injection quantity based on a variation in the in-cylinder pressure detected or estimated by the in-cylinder pressure detection means 61 relative to the reference in-cylinder pressure and the variation in the fuel injection quantity per unit in-cylinder pressure calculated by the unit fuel injection quantity variation calculation means 57b.

The basic structure of the internal combustion engine of this embodiment is the same as that in the first embodiment, and the parts in this embodiment same as those in the first embodiment will be designated by the same reference signs and descriptions thereof will be omitted.

In the case that the needle valve 23 does not reach the fully lifted state, especially in the case that fuel injection is effected in the state with a small lift amount, the actual pressure in the fuel injection process (the actual injection pressure) does not reach the rail pressure. In view of this, in this embodiment, the fuel injection quantity is corrected based on the pressure in the suction chamber 26 or the so-called suction chamber pressure (namely, the pressure actually applied to the injection hole (equivalent to the actual injection pressure)).

The suction chamber pressure is determined by the lift position of the needle valve 23 and the actual rail pressure detected by the rail pressure sensor 11. The lift position of the needle valve 23 is determined by the time and the lifting speed of the needle valve 23. The lifting speed of the needle valve 23 can be determined based on the characteristics of the orifice flow flowing out of the control camber 32 through the outlet orifice 34a. The movement can be assumed to be uniform motion, that is the lifting speed of the needle valve 23 can be assume to be substantially constant. Therefore, the suction chamber pressure can be represented as a function of the time, and it can be obtained based on the time. This corresponds to calculation of the pressure in the suction chamber 26 by the suction chamber pressure calculation means 57a.

Thus, if a map for obtaining the variation in fuel injection quantity per unit in-cylinder pressure based on the required fuel injection quantity calculated by the required fuel injection quantity calculation means 55 and the suction chamber pressure is prepared in advance by, for example, experiments, it is possible to calculate the variation in the fuel injection quantity based on the variation in fuel injection quantity per unit in-cylinder pressure and the variation in the in-cylinder pressure of the engine relative to the reference in-cylinder pressure. The aforementioned map constitutes the unit fuel injection quantity variation calculation means 57b.

According to this embodiment, since in the case that the fuel injection is completed before the lift amount of the needle valve 23 reaches the full lift, a correction value is calculated based on the suction chamber pressure that is equivalent to the actual injection pressure, correction with improved accuracy can be realized. In connection with this process, determination as to whether the execution of the fuel injection is completed before the lift amount of the needle valve 23 reaches the full lift or not is determined based on the result of the comparison effected by the comparison means 60.

Embodiment 3

In the third embodiment of the present invention, correction of the fuel injection quantity is performed based on the rail pressure Pcr and the in-cylinder pressure of the engine Pcl, unlike with the first embodiment. Specifically, when the in-cylinder pressure of the engine Pcl increases, it is assumed that the rail pressure Pcr has decreased, and fuel injection time is calculated while compensating the variation in the fuel injection quantity due to a change in the fuel injection rate based on the difference between the rail pressure Pcr and the in-cylinder pressure of the engine Pcl. In addition, when the in-cylinder pressure of the engine Pcl increases, it is assumed that the rail pressure Pcr has increased, and variation in fuel injection start time is calculated based on the sum of the rail pressure Pcr and the in-cylinder pressure of the engine Pcl.

Figure 11:
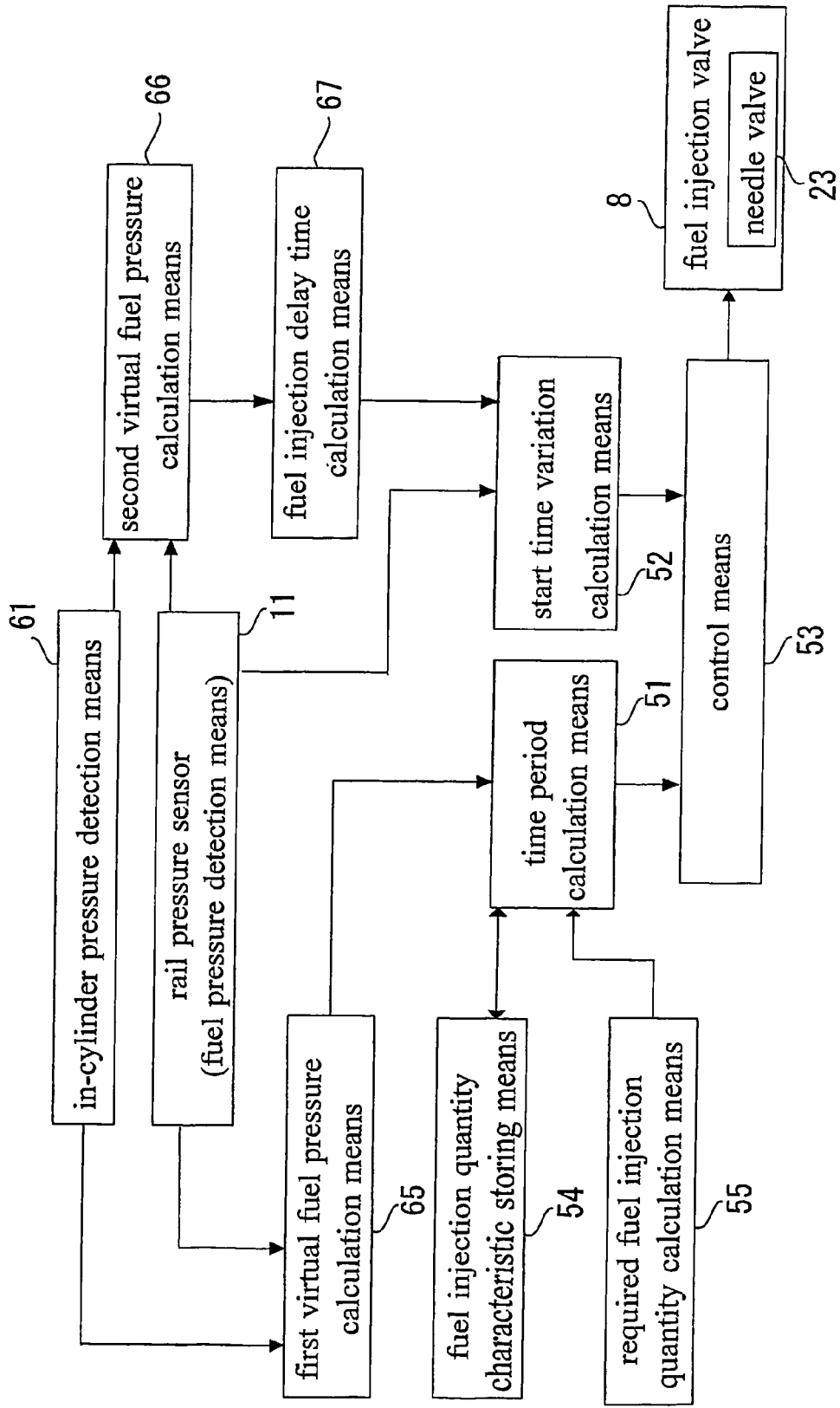
FIG. 11 is a block diagram showing a fuel injection control apparatus according to a third embodiment of the present invention.

FIG. 11 is a block diagram of the fuel injection control apparatus in this embodiment.

As shown in FIG. 11, the fuel injection control apparatus according to this embodiment is equipped with the time period calculation means 51, start time variation calculation means 52 and control means 53.

The time period calculation means 51 calculates the fuel injection time period being corrected to compensate a variation in the fuel injection quantity caused by a variation in the fuel injection rate due to a variation in the in-cylinder pressure detected or estimated by the in-cylinder pressure detection means 61 relative to a reference in-cylinder pressure that is stored in advance.

The start time variation calculation means 52 calculates a variation in the fuel injection start time at the in-cylinder pressure detected or estimated by in-cylinder pressure detection means 61 relative to the fuel injection start time at the reference in-cylinder pressure described later.

The control means 53 controls the time period over which fuel is injected from the fuel injection valve 8 based on the fuel injection time period calculated by the time period calculation means 51 and the variation in the fuel injection start time calculated by the start time variation calculation means 52.

The fuel injection control apparatus according to this embodiment is further equipped with the rail pressure sensor 11 for detecting the pressure of the high pressure fuel supplied to the fuel injection valve 8; the fuel injection quantity characteristic storing means 54 for storing a characteristic, in relation to valve opening time of the fuel injection valve 8, of the fuel injection quantity injected by the fuel injection valve 8 during the valve opening time in accordance with the pressure of the high pressure fuel supplied to the fuel injection valve 8; the required fuel injection quantity calculation means 55 for calculating a desired fuel injection quantity based on the running state of the internal combustion engine; the first virtual fuel pressure calculation means 65 for calculating a first virtual fuel pressure by subtracting a variation in the in-cylinder pressure detected or estimated by the in-cylinder pressure detection means 61 relative to the reference in-cylinder pressure from the fuel pressure detected by the rail pressure sensor 11; the second virtual fuel pressure calculation means 66 for calculating a second virtual fuel pressure by adding a variation in the in-cylinder pressure detected or estimated by the in-cylinder pressure detection means 61 relative to the reference in-cylinder pressure to the fuel pressure detected by the rail pressure sensor 11; the injection delay time calculation means 67 for calculating injection delay time from the time at which a signal for opening the fuel injection valve 8 is generated to the time at which fuel injection by the fuel injection valve 8 is started, based on the fuel pressure detected by the rail pressure sensor 11.

The time period calculation means 51 calculates the fuel injection time period utilizing the fuel injection quantity characteristic storing means 54 based on the first virtual fuel pressure calculated by the first virtual fuel pressure calculation means 65 and the fuel injection quantity calculated by the required fuel injection quantity calculation means 55.

The start time variation calculation means 52 calculates, by means of the fuel injection delay time calculation means 67, a fuel injection delay time for the fuel pressure detected by the rail pressure sensor 11 and a fuel injection delay time for the second virtual fuel pressure calculated by the second virtual fuel pressure calculation means 66 and calculates the variation in the fuel injection start time from a difference between those injection delay times.

In this embodiment, the ECU 10 constitutes the first virtual fuel pressure calculation means 65, the second virtual fuel pressure calculation means 66 and the injection delay time calculation means 67. The basic structure of the internal combustion engine 1 of this embodiment is the same as that in the first embodiment, and the parts in this embodiment same as those in the first embodiment will be designated by the same reference signs and descriptions thereof will be omitted.

Figure 12:
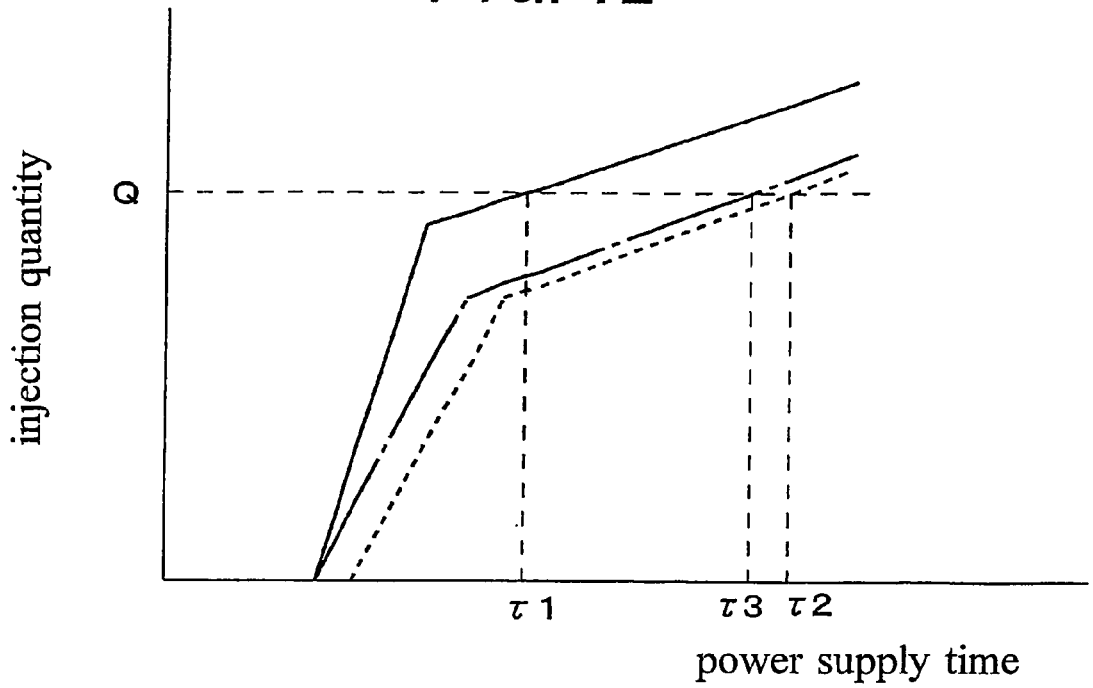
FIG. 12 is a $\tau$–Q map in the third embodiment of the present invention.

FIG. 12 shows a $\tau$–Q map serving as the fuel injection quantity characteristic storing means 54 in this embodiment.

In FIG. 12, the solid curve indicates the $\tau$–Q characteristic at the rail pressure Pcr (i.e. at the reference in-cylinder pressure Pcl'). When the required fuel injection quantity is Q, the power supply time for attaining the required fuel injection quantity Q at the rail pressure Pcr (at the reference in-cylinder pressure Pcl') determined from the $\tau$–Q characteristic indicated by the solid curve in FIG. 12 is $\tau 1$.

In FIG. 12, the broken curve indicates the $\tau$–Q characteristic at the first virtual rail pressure (Pcr–$\Delta$Pcl) obtained by subtracting the difference $\Delta$Pcl of the in-cylinder pressure of the engine Pcl and the reference in-cylinder pressure Pcl' from the rail pressure Pcr under the condition in which the in-cylinder pressure of the engine Pcl is applied to the rail pressure Pcr. The power supply time for attaining the required fuel injection quantity Q at the first virtual rail pressure (Pcr–$\Delta$Pcl) determined from the $\tau$–Q characteristic indicated by the broken curve in FIG. 12 is $\tau 2$.

As per the above, since in the stationary running state, the flow rate through the injection hole can be determined based on the pressure difference between the interior and the exterior, injection with a required fuel injection quantity can be attained by replacing the rail pressure with the pressure difference between the rail pressure and the in-cylinder pressure of the engine as the virtual rail pressure directly. Therefore, in the stationary running state, additional calculation for correction is not required and errors through calculation hardly occur. The use of the pressure difference between the rail pressure and the in-cylinder pressure of the engine as a virtual rail pressure corresponds to calculation of the first virtual fuel pressure by the first virtual fuel pressure calculation means 65.

However, the variation in the fuel injection start time is not corrected even when the pressure difference is substituted for the rail pressure. This is because at the time of opening the needle valve 23, the area on which the in-cylinder pressure acts is small as compared to the area on which the fuel pressure acts, and because the deceasing speed of the fluid pressure in the control chamber 32 varies depending on the rail pressure.

In view of this, in this embodiment, correction of the fuel injection start time is effected in the following manner.

Figure 13:
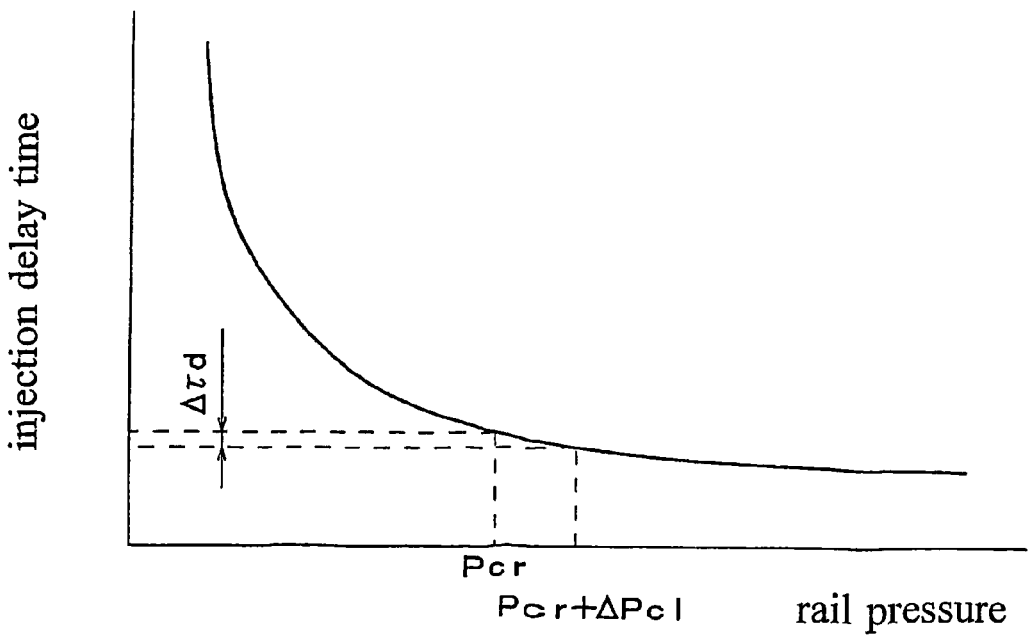
FIG. 13 shows the relationship between the rail pressure Pcr and the fuel injection delay time $\tau d$.

FIG. 13 shows the relationship between the rail pressure Pcr and the fuel injection delay time Id in this embodiment. The map containing this relationship constitutes the fuel injection delay time calculation means 67.

From the relationship shown in FIG. 13, the time difference $\Delta\tau d$ between the fuel injection delay time at the rail pressure Pcr and the fuel injection delay time at a second virtual rail pressure (Pcr+$\Delta$Pcl) obtained by adding the difference $\Delta$Pcl of the in-cylinder pressure of the engine Pcl and the reference in-cylinder pressure Pcl' to the rail pressure Pcr is obtained.

A $\tau$–Q characteristic in which the difference Aid between the fuel injection delay time at the rail pressure Pcr and the fuel injection delay time at the second virtual rail pressure (Pcr+$\Delta$Pcl) has been compensated is indicated as the dashed line in FIG. 12. In this case, the power supply time for attaining the required fuel injection quantity Q is $\tau 3$. The power supply time $\tau 3$ can be represented by the following formula (15).

$$\tau 3 = \tau 2 - \Delta \tau d \qquad (15)$$

When the final power supply time thus determined is applied as the power supply time for the fuel injection valve 8, the fuel injection can be effected with improved accuracy in the injection quantity. The above-described process of obtaining the second virtual rail pressure (Pcr+$\Delta$Pcl) by adding the difference $\Delta$Pcl of the in-cylinder pressure of the engine Pcl and the reference in-cylinder pressure Pcl' to the rail pressure Pcr corresponds to calculation of the second virtual fuel pressure by the second virtual pressure calculation means 66.

INDUSTRIAL APPLICABILITY

According to the present invention, it is possible to control the fuel injection quantity that changes with changes in the in-cylinder pressure with improved accuracy, and it is possible to attain a target fuel injection quantity irrespectively of the running state of the internal combustion engine.

What is claimed is:

1. A fuel injection control apparatus for an internal combustion engine equipped with a fuel injection valve for directly injecting high pressure fuel supplied by high pressure fuel supply means into a cylinder, comprising:

in-cylinder pressure detection means for detecting or estimating in-cylinder pressure of said cylinder;

time period calculation means for calculating fuel injection time period over which fuel is injected from said fuel injection valve, the fuel injection time period being corrected to compensate a variation in the fuel injection quantity caused by a variation in the fuel injection rate due to a variation in the in-cylinder pressure detected or estimated by said in-cylinder pressure detection means relative to a reference in-cylinder pressure that is stored in advance;

start time variation calculation means for calculating a variation in the fuel injection start time at the in-cylinder pressure detected or estimated by said in-cylinder pressure detection means relative to the fuel injection start time at said reference in-cylinder pressure;

control means for controlling the time period over which fuel is injected from said fuel injection valve based on the fuel injection time period calculated by said time period calculation means and the variation in the fuel injection start time calculated by said start time variation calculation means.

2. A fuel injection control apparatus for an internal combustion engine according to claim 1, further comprising:

fuel pressure detection means for detecting the pressure of the high pressure fuel supplied to said fuel injection valve by said high pressure fuel supply means;

fuel injection quantity characteristic storing means for storing a characteristic, in relation to valve opening time of said fuel injection valve, of the fuel injection quantity injected by said fuel injection valve during the valve opening time in accordance with the pressure of the high pressure fuel supplied to said fuel injection valve by said high pressure fuel supply means;

required fuel injection quantity calculation means for calculating a desired fuel injection quantity based on the running state of the internal combustion engine;

fuel injection rate calculation means for calculating fuel injection rate based on the fuel pressure detected by said fuel pressure detection means and the in-cylinder pressure detected or estimated by said in-cylinder pressure detection means;

fuel injection quantity variation calculation means for calculating a variation in the fuel injection quantity caused by a variation in a second fuel injection rate calculated by said fuel injection rate calculation means based on the in-cylinder pressure detected or estimated by said in-cylinder pressure detection means relative to a first fuel injection rate calculated by said fuel injection rate calculation means based on said reference in-cylinder pressure;

coefficient calculation means for calculating a variation in fuel injection delay time per unit in-cylinder pressure for the fuel pressure detected by said fuel pressure detection means, wherein, said time period calculation means calculates the fuel injection time period utilizing said fuel injection quantity characteristic storing means based on the variation in the fuel injection quantity calculated by said fuel injection quantity variation calculation means and the fuel injection quantity calculated by said required fuel injection quantity calculation means, said start time variation calculation means calculates the variation in the fuel injection start time based on a variation in the in-cylinder pressure detected or estimated by said in-cylinder pressure detection means relative to said reference in-cylinder pressure and the variation calculated by said coefficient calculation means.

3. A fuel injection control apparatus for an internal combustion engine according to claim 2, further comprising:

a needle valve provided in said fuel injection valve that moves in the axial direction to effect valve opening and closing operations;

fuel injection quantity estimation means for estimating, when fuel injection by said fuel injection valve is started, the quantity of fuel injected since the valve opening operation of said needle valve is started until said needle valve reaches a full open state, based on the fuel pressure detected by said fuel pressure detection means and the in-cylinder pressure detected or estimated by said in-cylinder pressure detection means;

comparison means for comparing the estimated fuel quantity estimated by said fuel injection quantity estimation means and the fuel injection quantity calculated by said required fuel injection quantity calculation means, wherein, said fuel injection quantity variation calculation means calculates the variation in the fuel injection quantity using different calculation processes, in accordance with a result of the comparison by said comparison means, between in the case that said fuel injection quantity is less than said estimated fuel quantity and in the case that said fuel injection quantity is more than or equal to said estimated fuel quantity.

4. A fuel injection control apparatus for an internal combustion engine according to claim 2, wherein said fuel injection quantity variation calculation means calculates the variation in the fuel injection quantity by modeling a change with time in the fuel injection rate as a polygon in a coordinate system and calculating a change in the area of said polygon.

5. A fuel injection control apparatus for an internal combustion engine according to claim 3, wherein said fuel injection quantity variation calculation means further comprises:

suction chamber pressure calculation means for calculating pressure in a suction chamber formed in the tip end side of a valve seat on/from which said needle valve is to be received/detached, based on the fuel pressure detected by said fuel pressure detection means and the position of said needle valve;

unit fuel injection quantity variation calculation means for calculating a variation in the fuel injection quantity per unit in-cylinder pressure based on the fuel injection quantity calculated by said required fuel injection quantity calculation means and the suction chamber pressure calculated by said suction chamber pressure calculation means, wherein, when according to a result of the comparison by said comparison means, said fuel injection quantity is less than said estimated fuel injection quantity, said fuel injection quantity variation calculation means calculates the variation in the fuel injection quantity based on a variation in the in-cylinder pressure detected or estimated by said in-cylinder pressure detection means relative to said reference in-cylinder pressure and the variation in the fuel injection quantity per unit in-cylinder pressure calculated by said unit fuel injection quantity variation calculation means.

6. A fuel injection control apparatus for an internal combustion engine according to claim 1, further comprising:

fuel pressure detection means for detecting the pressure of the high pressure fuel supplied to said fuel injection valve by said high pressure fuel supply means;

fuel injection quantity characteristic storing means for storing a characteristic, in relation to valve opening time of said fuel injection valve, of the fuel injection quantity injected by said fuel injection valve during the valve opening time in accordance with the pressure of the high pressure fuel supplied to said fuel injection valve by said high pressure fuel supply means;

required fuel injection quantity calculation means for calculating a desired fuel injection quantity based on the running state of the internal combustion engine;

first virtual fuel pressure calculation means for calculating a first virtual fuel pressure by subtracting a variation in the in-cylinder pressure detected or estimated by said in-cylinder pressure detection means relative to said reference in-cylinder pressure from the fuel pressure detected by said fuel pressure detection means;

second virtual fuel pressure calculation means for calculating a second virtual fuel pressure by adding a variation in the in-cylinder pressure detected or estimated by said in-cylinder pressure detection means relative to said reference in-cylinder pressure to the fuel pressure detected by said fuel pressure detection means;

injection delay time calculation means for calculating injection delay time from the time at which a signal for opening said fuel injection valve is generated to the time at which fuel injection by said fuel injection valve is started, based on the fuel pressure detected by said fuel pressure detection means, wherein, said time period calculation means calculates the fuel injection time period utilizing said fuel injection characteristic storing means based on the first virtual fuel pressure calculated by said first virtual fuel pressure calculation means and the fuel injection quantity calculated by said required fuel injection quantity calculation means, and said start time variation calculation means calculates, by means of said fuel injection delay time calculation means, a fuel injection delay time for the fuel pressure detected by said fuel pressure detection means and a fuel injection delay time for the second virtual fuel pressure calculated by said second virtual fuel pressure calculation means and calculates the variation in the fuel injection start time from a difference between those injection delay times.

7. A fuel injection control apparatus for an internal combustion engine according to claim 3, wherein said fuel injection quantity variation calculation means calculates the variation in the fuel injection quantity by modeling a change with time in the fuel injection rate as a polygon in a coordinate system and calculating a change in the area of said polygon.

* * * * *